(12) United States Patent
Pechacek et al.

(10) Patent No.: US 11,977,881 B2
(45) Date of Patent: May 7, 2024

(54) ISSUE TRACKING SYSTEMS AND METHODS

(71) Applicants: Atlassian Pty Ltd., Sydney (AU); Atlassian Inc., San Francisco, CA (US)

(72) Inventors: Taylor Pechacek, Sydney (AU); Rodrigo Berto, Sydney (AU); Oliver Burn, Sydney (AU); James Navin, Sydney (AU); Boris Gvozdev, Sydney (AU); Christian Rolf, Sydney (AU); Daniel Kerris, Sydney (AU); Dmitry Pak, Sydney (AU); Gustavo Maciel, Sydney (AU); Konstantine Abakumov, Sydney (AU); Karina Moraes Da Silva, Sydney (AU); Rafal Myslek, Sydney (AU); Bruce Templeton, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 17/976,604

(22) Filed: Oct. 28, 2022

(65) Prior Publication Data
US 2023/0054969 A1 Feb. 23, 2023

Related U.S. Application Data

(63) Continuation of application No. 17/307,078, filed on May 4, 2021, now Pat. No. 11,487,532, which is a
(Continued)

(51) Int. Cl.
*G06F 8/71* (2018.01)
*G06F 8/20* (2018.01)
(Continued)

(52) U.S. Cl.
CPC ............... *G06F 8/71* (2013.01); *G06F 8/24* (2013.01); *G06F 8/41* (2013.01); *G06F 8/60* (2013.01); *G06F 8/77* (2013.01); *G06Q 10/103* (2013.01)

(58) Field of Classification Search
CPC ..... G06F 8/71; G06F 8/24; G06F 8/41; G06F 8/60; G06F 8/77
(Continued)

(56) References Cited

U.S. PATENT DOCUMENTS

| 5,903,897 A | 5/1999 | Carrier, III |
| 6,195,795 B1 | 2/2001 | Block |

(Continued)

*Primary Examiner* — John Q Chavis
(74) *Attorney, Agent, or Firm* — Brownstein Hyatt Farber Schreck, LLP

(57) ABSTRACT

Described herein is a computer implemented method. The method comprises receiving, by an issue tracking system, a deployment update from a deployment system which includes deployment information in respect of one or more issues maintained by the issue tracking system. The method further comprises associating one or more issues maintained by the issue tracking system with deployment information by identifying the one or more issues to which the deployment information in the deployment update relates, extracting the deployment information from the deployment update, and associating the deployment information with each of the identified issues.

21 Claims, 8 Drawing Sheets

Related U.S. Application Data continuation of application No. 16/369,870, filed on Mar. 29, 2019, now Pat. No. 11,016,759, and a continuation of application No. 16/369,843, filed on Mar. 29, 2019, now Pat. No. 11,138,002, and a continuation of application No. 16/206,792, filed on Nov. 30, 2018, now Pat. No. 11,023,838.

(60) Provisional application No. 62/737,942, filed on Sep. 28, 2018.

(51) Int. Cl.
  *G06F 8/41* (2018.01)
  *G06F 8/60* (2018.01)
  *G06F 8/77* (2018.01)
  *G06Q 10/10* (2023.01)

(58) Field of Classification Search
  USPC ........................................................ 717/103
  See application file for complete search history.

(56) References Cited

U.S. PATENT DOCUMENTS

| | | | |
|---|---|---|---|
| 6,256,773 B1 | 7/2001 | Bowman-Amuah et al. | |
| 6,487,713 B1 | 11/2002 | Cohen | |
| 7,437,722 B2 | 10/2008 | Poole et al. | |
| 7,516,438 B1 | 4/2009 | Leonard et al. | |
| 8,548,967 B1 | 10/2013 | Poole | |
| 9,727,736 B1 * | 8/2017 | McClintock | G06F 11/3604 |
| 10,162,740 B1 | 12/2018 | Setty | |
| 10,395,117 B1 | 8/2019 | Zhang et al. | |
| 2004/0230964 A1 | 11/2004 | Waugh | |
| 2005/0015675 A1 | 1/2005 | Kolawa | |
| 2006/0218028 A1 | 9/2006 | Kelly et al. | |
| 2006/0236301 A1 | 10/2006 | Minium | |
| 2007/0006041 A1 | 1/2007 | Brunswig | |
| 2007/0011649 A1 | 1/2007 | Venolia et al. | |
| 2009/0324013 A1 | 12/2009 | Tanaka et al. | |
| 2010/0325602 A1 | 12/2010 | Kraft, IV et al. | |
| 2013/0036402 A1 | 2/2013 | Mutisya | |
| 2013/0074038 A1 | 3/2013 | Fox et al. | |
| 2013/0212562 A1 | 8/2013 | Fox et al. | |
| 2014/0201573 A1 | 7/2014 | Huang et al. | |
| 2014/0325278 A1 | 10/2014 | Omar et al. | |
| 2015/0019564 A1 | 1/2015 | Higginson et al. | |
| 2015/0081572 A1 | 3/2015 | Thomas et al. | |
| 2015/0082293 A1 | 3/2015 | Thomas et al. | |
| 2017/0132545 A1 | 5/2017 | Michaely | |
| 2017/0168870 A1 | 6/2017 | Allan et al. | |
| 2018/0121182 A1 | 5/2018 | Owen et al. | |
| 2018/0173510 A1 | 6/2018 | Koshkin et al. | |
| 2018/0270122 A1 | 9/2018 | Brown et al. | |
| 2020/0104773 A1 | 4/2020 | Pechacek | |

* cited by examiner

ISSUE TRACKING SYSTEMS AND METHODS

CROSS-REFERENCE TO RELATED APPLICATION(S)

This application is a continuation patent application of U.S. patent application Ser. No. 17/307,078, filed May 4, 2021 and titled "Issue Tracking Systems and Methods," which is a continuation patent application of U.S. patent application Ser. No. 16/369,870, filed Mar. 29, 2019 and titled "Issue Tracking Systems and Methods," now U.S. Pat. No. 11,016,759, and this application is a continuation patent application of U.S. patent application Ser. No. 16/369,843, filed Mar. 29, 2019 and titled "Issue Tracking Systems and Methods," now U.S. Pat. No. 11,138,002 and this application is a continuation patent application of U.S. patent application Ser. No. 16/206,792, filed Nov. 30, 2018 and titled "Issue Tracking Systems and Methods," now U.S. Pat. No. 11,023,838, all of which are nonprovisional patent applications of and claims the benefit of provisional application 62/737,942, filed Sep. 28, 2018 and titled "Issue Tracking Systems and Methods," the disclosures of which are hereby incorporated herein by reference in their entireties.

FIELD

The present disclosure is directed to issue tracking systems and methods.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Software development is a complex process which can involve the use of multiple different tools and systems. By way of example, a given software development project may involve an issue tracking system, a source code management system, a build system, a test system, a deployment system, and a feature flag system.

The number of different systems/tools that can be involved in a software development project can make it challenging to understand the state of a given project at any given time.

This complexity is exacerbated where continuous integration and continuous delivery/deployment software development/release methodologies are adopted. Generally speaking, such methodologies involve maintaining a software code base in a form that can be reliably released at any time and, typically, releasing software revisions to the live/production environment far more frequently when compared to traditional software development approaches.

SUMMARY

The appended claims may serve as a summary of the invention.

Figure 1:
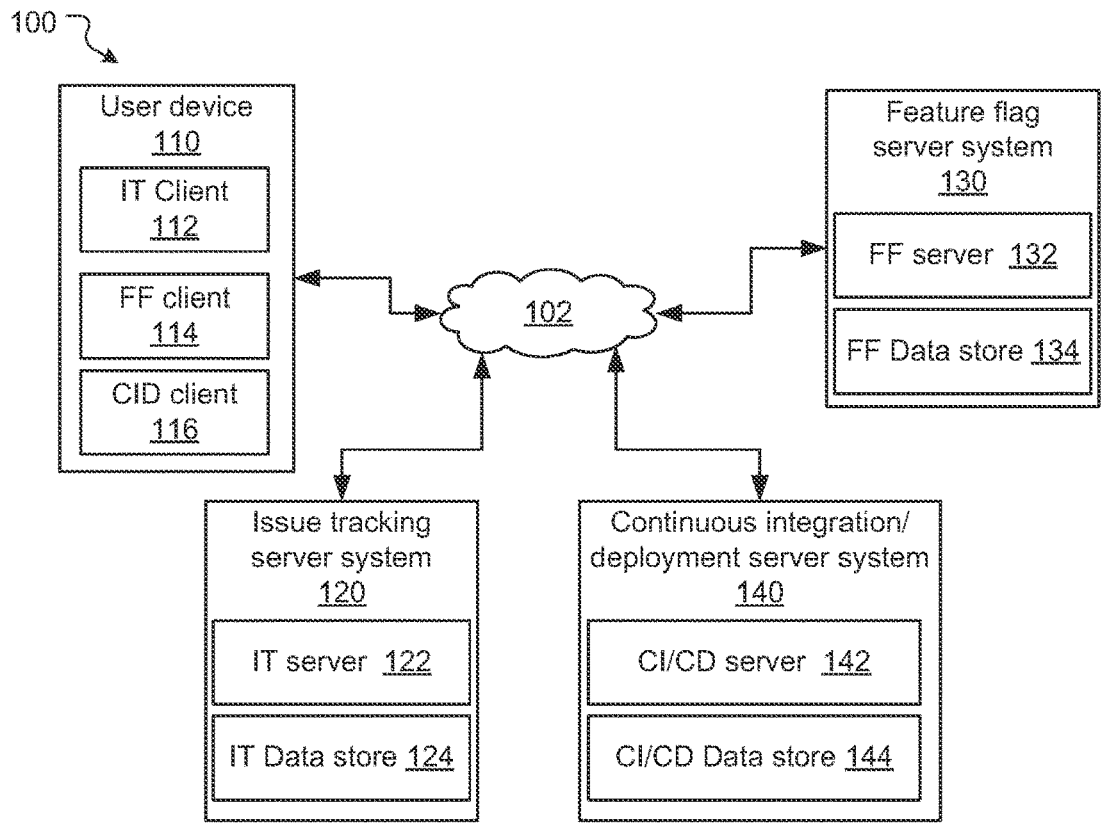
FIG. 1 is a block diagram of a networked environment according to aspects of the present disclosure.

While the invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

As described above, various software products/systems can be used to assist with developing and releasing software. These include, for example, issue tracking systems, source code management systems, build systems, test systems, deployment systems, and feature flag systems.

Very generally speaking, issue tracking systems (such as Atlassian's Jira for instance) allow users to perform various actions with respect to issues—for example, create issues, associate issues with projects and/or other issues, transition issues between workflow states, add/edit information associated with issues, assign issues to specific people/teams.

Issue tracking systems also allow for management of an issue, for example user permissions defining: users that can see an issue and its associated information; users who can edit an issue; users who can transition an issue into/out of a particular workflow state; users who should be automatically notified any time an issue changes (either any change or a particular change), etc.

One common use scenario for issue tracking systems is to set up projects corresponding to software products (e.g. project A corresponds to software product A). A person or team who comes up with an idea for a new feature for software produce A (feature A) may then create an issue (or set of related issues) for the feature and associate the issue with project A. As development of feature A progresses (e.g. planned, developed, built, tested, released, enabled, marketed, supported, etc.), the feature B issue transitions through various workflow states with information being added to the issue by the relevant stakeholders.

Historically, however, issue tracking systems have not been integrated with other systems used in the software development/deployment lifecycle—e.g., feature flag systems (which facilitate the creation and management of feature flags), continuous integration systems (which facilitate building and testing of software), and or continuous delivery/deployment systems (which facilitate deployment of software, ultimately to a production environment). As a result, while looking at an issue may provide some information as to the progress of the issue, other information of potentially critical importance is not immediately available. In most cases such information can be found by switching from the issue tracking system to other systems, but doing so can range from inconvenient to unmanageably complex (e.g. needing to know what other system to look at, having the credentials to access that system, how to find the information in that system relevant to the issue in question).

Consider, for example, an issue in respect of a feature that has been released under a feature flag. While the issue tracking system may indicate that the issue is complete (indicating that the code for the feature has been deployed) this is not of course the complete picture. Specifically, feature flag information indicating whether the feature has been rolled out or not could not be discerned or accessed from the issue tracking systems. Instead, any stakeholder interested in feature flag information in respect of a feature would somehow need to first determine whether the feature was set up with a feature flag or not, and if so: determine what system was used to manage the feature flag; whether the stakeholder in question has access to the feature flag system (and, if so, how/using what credentials); if the stakeholder does not have access to the feature flag system, determine whether they can obtain access to it (and, if so, how/by what process); if and when the stakeholder accesses the feature flag system, determine how the feature in question is identified in that system; etc.

The embodiments described herein involve configuring issue tracking systems to serve as a nexus for software development cycle information.

An overview of one example environment illustrating different systems involved in certain embodiments will be described, followed by a description of a computer system which can be configured in various ways to perform the embodiments/various features thereof as described herein. Following this, integrations between issue tracking systems and feature flag systems, between issue tracking systems and build systems, and between issue tracking systems and deployment systems will be described. While each of these integrations are described separately for clarity they can be used in conjunction. For example, an issue tracking system can be integrated with a single or multiple feature flag systems, build systems, and deployment systems at the same time.

Environment Overview

FIG. 1 illustrates an example environment 100 in which embodiments and features of the present disclosure are implemented. Example environment 100 includes a communications network 102 which interconnects a user device 110, an issue tracking server system 120, a feature flag server system 130, a continuous integration/continuous deployment server system 140.

For ease of reference, the acronym IT will be used herein in place of "issue tracking" and the acronym FF will be used herein in place of "feature flag" and the acronym CID will be used herein in place of "continuous integration/deployment".

User device 110 is a computer processing system with an IT client application 112, a FF client application 114, and a CID client application 116 installed thereon. User device 110 will also have other applications installed/running thereon, for example an operating system.

When executed by the user device 110 (e.g. by a processor such as processor 204 described below), the IT client application 112 configures the user device 110 to provide client-side IT system functionality. This involves communicating (using a communication interface such as 218 described below) with the IT server system 120 (and, in particular, the IT server 122). IT client 112 may be a dedicated application client that communicates with an IT application server using an API. Alternatively, IT client 112 may be a web browser (such as Chrome, Safari, Internet Explorer, Firefox, or an alternative web browser) which communicates with an IT web server using http/https protocols.

When executed by the user device 110 (e.g. by a processor such as processor 204), the FF client application 114 configures the user device 110 to provide client-side FF system functionality. This involves communicating with the FF server system 130 (and, in particular, the FF server 132). FF client 114 may be a dedicated application client that communicates with a FF application server using an API. Alternatively, FF client 114 may be a web browser which communicates with a FF web server using http/https protocols.

When executed by the user device 110 (e.g. by a processor such as processor 204), the CID client application 116 configures the user device 110 to provide client-side CID system functionality. This involves communicating with the CID server system 140 (and, in particular, the CID server 142). CID client 116 may be a dedicated application client that communicates with a CID application server using an API. Alternatively, CID client 116 may be a web browser which communicates with a CID web server using http/https protocols.

While user device 110 has been shown with separate IT, FF and CID clients 112, 114 and 116, a single application may be used as two or more of the IT, FF and CID client applications (e.g. a web browser, in which case the corresponding IT, FF and/or CID servers 122, 132 and 134 are web servers). Furthermore, if user device 110 interacts with separate continuous integration and continuous deployment systems (rather than a combined CID system such as 140) it may have separate continuous integration and continuous deployment client applications rather than a single CID client application 116.

User device 110 may be any form of computing device. Typically, user device 110 will be a personal computing device—e.g. a desktop computer, laptop computer, tablet computer, and in some instance even a mobile phone. While a single user device 110 has been illustrated, an environment would typically include multiple user devices 110 interacting with the IT server system 120 and/or FF server system 130.

IT server system 120 includes an IT server 122 and an IT data store 124. The IT server 122 configures the IT server system 120 to provide server side IT system functionality—e.g. by receiving and responding to requests from IT clients (e.g. client 112), storing/retrieving data from the IT data store 124, and interacting with other systems (for example receiving updates from the FF and/or CID systems).

IT server 122 may be a web server (for interacting with web browser clients) or an application server (for interacting with dedicated application clients). While IT server system 120 has been illustrated with a single server 122 it may provide multiple servers (e.g. one or more web servers and/or one or more application servers).

In certain embodiments, IT server system 120 is a scalable system including multiple distributed server nodes connected to the shared data store 124 (e.g. a shared file server). Depending on demand from clients (and/or other performance requirements), IT server system 120 server nodes can be provisioned/de-provisioned on demand to increase/decrease the number of servers offered by the IT server system 120. Each IT server 122 may run on a separate computer system and include one or more application programs, libraries, APIs or other software that implement server-side functionality. Similarly, IT data store 124 may run on the same computer system as an IT server 122, or may run on its own dedicated system (accessible to IT server(s) 122 either directly or via a communications network).

The IT server 122 (running on IT server system 120) and IT client 112 (running on user device 110) operate together to provide an IT system/IT system functionality. Operations described herein as IT operations or operations being performed by the IT system may be performed by the IT client 112 (operating on user device 110), the IT server 122 (operating on IT server system 120) or the IT client 112 and IT server 122 in cooperation. For example, IT operations involving the display of user information involve displaying information on the user device 110 (e.g. on a display such as 212) as controlled by the IT client 112. The data displayed, however, may be generated by the IT client 112 itself, or generated by the IT server 122 and communicated to the IT client 112 therefrom. As a further example, IT operations involving user input involve the user device 110 receiving user input (e.g. at input device 214) and passing that input to the IT client 112. The information input may be processed by the IT client 112 itself, or communicated by the IT client 112 to the IT server 122 to be processed by the IT server 122. IT operations involving writing data to the IT data store 124 involve the IT server 122. The data written to the IT data store 124 may, however, be communicated to the IT server 122 by the IT client 112 (or by another system, e.g. the FF system 130 or CID system 140).

One example of an IT system is Jira.

FF server system 130 includes an FF server 132 and an FF data store 134. The FF server 132 configures the FF server system 130 to provide server side FF system functionality—e.g. by receiving and responding to requests from FF clients (e.g. client 114), storing/retrieving data from the FF data store 134, and interacting with other systems (for example communicating updates to the IT system).

FF server 132 may be a web server (for interacting with web browser clients) or an application server (for interacting with dedicated application clients). While FF server system 130 has been illustrated with a single server 132 it may provide multiple servers (e.g. one or more web servers and/or one or more application servers).

In certain embodiments, FF server system 130 is a scalable system including multiple distributed server nodes connected to the shared data store 134 (e.g. a shared file server). Depending on demand from clients (and/or other performance requirements), FF server system 130 server nodes can be provisioned/de-provisioned on demand to increase/decrease the number of servers offered by the FF server system 130. Each FF server 132 may run on a separate computer system and include one or more application programs, libraries, APIs or other software that implement server-side functionality. Similarly, FF data store 134 may run on the same computer system as an FF server 132, or may run on its own dedicated system (accessible to FF server(s) 132 either directly or via a communications network).

The FF server 132 (running on FF server system 130) and FF client 114 (running on user device 110) operate together to provide a FF system/FF system functionality. Generally speaking, operations described herein as FF operations may be performed by the FF client 114 (operating on user device 110), the FF server 132 (operating on FF 123) or the FF client 114 and FF server 132 in cooperation. FF operations involving the display of user information involve the user device 110 as controlled by the FF client 114. The data displayed, however, may be generated by the FF client 114 itself, or generated by the FF server 132 communicated to the FF client 114. Similarly, FF operations involving user input involve the user device 110 receiving user input (e.g. at input device 214) and passing that input to the FF client 114. The information input may be processed by the FF client 114 itself, or communicated by the FF client 114 to the FF server 132 to be processed by the FF server 132. FF operations involving writing data to the FF data store 134 involve the FF server 132. The data written to the FF data store 134 may, however, be communicated to the FF server 132 by the FF client 114 (or by another system).

Examples of FF systems include LaunchDarkly and Rollout.

CID server system 140 includes a CID server 142 and a CID data store 144. The CID server 142 configures the CID server system 140 to provide server side CID system functionality—e.g. by receiving and responding to requests from CID clients (e.g. client 116), storing/retrieving data from the CID data store 144, and interacting with other systems (for example retrieving source code from a source code management system (not shown) and communicating updates to the IT system).

CID server 142 may be a web server (for interacting with web browser clients) or an application server (for interacting with dedicated application clients). While CID server system 140 has been illustrated with a single server 142 it may provide multiple servers (e.g. one or more web servers and/or one or more application servers).

In certain embodiments, CID server system 140 is a scalable system including multiple distributed server nodes connected to the shared data store 144 (e.g. a shared file server). Depending on demand from clients (and/or other performance requirements), CID server system 140 server nodes can be provisioned/de-provisioned on demand to increase/decrease the number of servers offered by the CID server system 140. Each CID server 142 may run on a separate computer system and include one or more application programs, libraries, APIs or other software that implement server-side functionality. Similarly, CID data store 144 may run on the same computer system as a CID server 142, or may run on its own dedicated system (accessible to CID server(s) 142 either directly or via a communications network).

In the present embodiments, CID system 140 operates to perform several tasks encountered in a typical software deployment pipeline: builds, testing, and deployment. One example of a CID system is Bamboo. In alternative embodiments different systems may be used for different parts of this pipeline—e.g. a continuous integration system handling builds and testing and a separate continuous deployment systems handling deployments.

Communications between the various systems in environment 100 are via the communications network 102. Communications network may be a local area network, public network (e.g. the Internet), or a combination of both.

While environment 100 has been provided as an example, alternative system environments/architectures are possible.

Hardware Overview

The embodiments and features described herein are implemented by one or more special-purpose computing systems or devices. For example, in environment 100 each of the user device 110, IT server system 120, FF server system 130, and CID server system 140 is or includes a type of computing system.

A special-purpose computing system may be hard-wired to perform the relevant operations. Alternatively, a special-purpose computing system may include digital electronic devices such as one or more application-specific integrated circuits (ASICs) or field programmable gate arrays (FPGAs) that are persistently programmed to perform the relevant operations. Further alternatively, a special-purpose computing system may include one or more general purpose hardware processors programmed to perform the relevant operations pursuant to program instructions stored in firmware, memory, other storage, or a combination.

A special-purpose computing system may also combine custom hard-wired logic, ASICs, or FPGAs with custom programming to accomplish the relevant operations described herein. A special-purpose computing system may be a desktop computer system, a portable computer system, a handheld device, a networking device or any other device that incorporates hard-wired and/or program logic to implement relevant operations.

Figure 2:
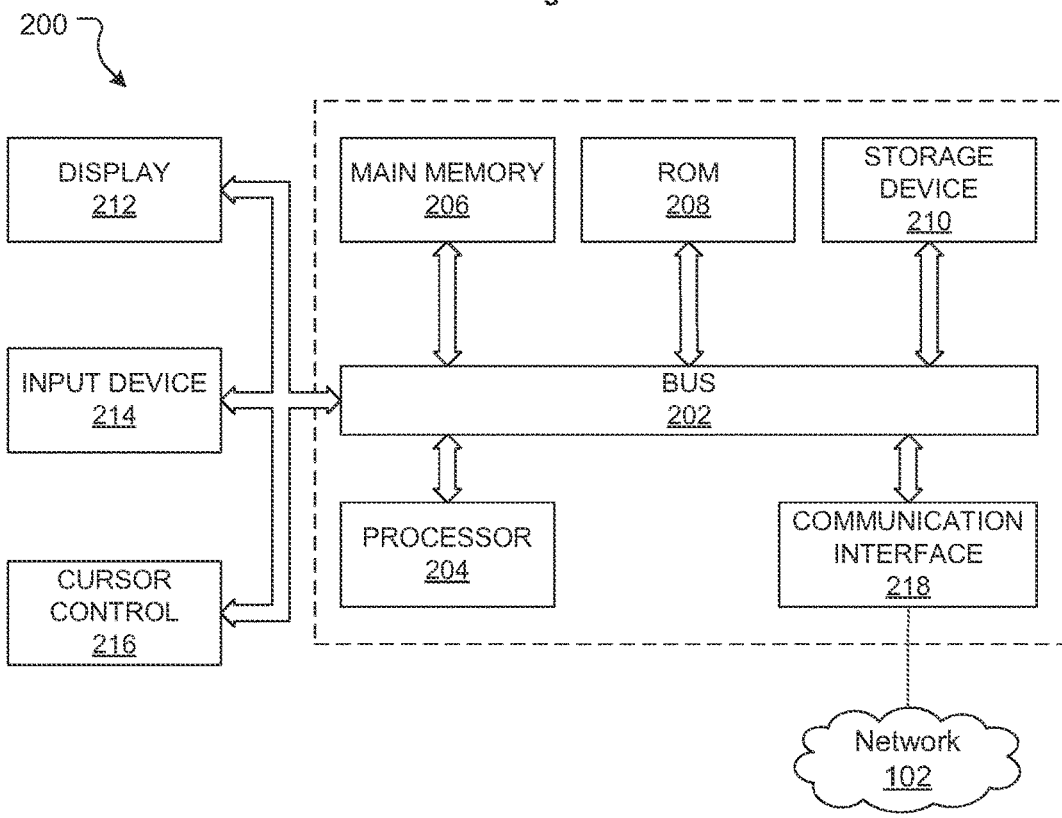
FIG. 2 is a block diagram of a computing system with which various embodiments of the present disclosure may be implemented.

By way of example, FIG. 2 provides a block diagram that illustrates one example of a computer system 200 which may be configured to implement the embodiments and features described herein. Computer system 200 includes a bus 202 or other communication mechanism for communicating information, and a hardware processor 204 coupled with bus 202 for processing information. Hardware processor 204 may be, for example, a general purpose microprocessor, a graphical processing unit, or other processing unit.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

In case the computer system 200 is the client device 101, the computer system 200 may be coupled via bus 202 to a display 212 (such as an LCD, LED, touch screen display or other display), for displaying information to a computer user. An input device 214, including alphanumeric and other keys, may be coupled to the bus 202 for communicating information and command selections to processor 204. Another type of user input device is cursor control 216, such as a mouse, a trackball, or cursor direction keys for communicating direction information and command selections to processor 204 and for controlling cursor movement on display 212.

According to one embodiment, the techniques herein are performed by computer system 200 in response to processor 204 executing one or more sequences of one or more instructions contained in main memory 206. Such instructions may be read into main memory 206 from another storage medium, such as a remote database. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that stores data and/or instructions that cause a machine to operate in a specific fashion. Such storage media may comprise non-volatile media and/or volatile media. Non-volatile media includes, for example, optical or magnetic disks, such as storage device 210. Volatile media includes dynamic memory, such as main memory 206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Computer system 200 also includes a communication interface 218 coupled to bus 202. Communication interface 218 provides a two-way data communication coupling to a communication network, for example communication network 102 of environment 100. For example, communication interface 218 may be an integrated services digital network (ISDN) card, cable modem, satellite modem, etc. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Computer system 200 can send messages and receive data, including program code, through the network(s) 108, network link 220 and communication interface 218.

As noted, computer system 200 may be configured in a plurality of useful arrangements, and while the general architecture of system 200 may be the same regardless of arrangements there will be differences. For example, where computer system 200 is configured as a server computer (e.g. such as IT server system 120, FF server system 130, or CID system 140), it will typically be provided with higher end hardware allowing it to process data, access memory, and perform network communications more rapidly than, for example, a user device (such device 110).

Feature Flag System Integration

This section describes the integration of issue tracking systems with feature flag systems.

Generally speaking, feature flag systems are used to manage the deployment of software under feature flags (also referred to as, for example, feature toggles, feature switches, conditional features). A given feature flag relates to deployed source code which (on execution) provides one or more features in a software product. The feature flag essentially provides a conditional logic wrapper to the source code that enables it to be switched on (i.e. made available) or off (i.e. made unavailable). For example, when a feature flag is set to true, the software product when executed makes the feature(s) associated with that flag available. Conversely, when a feature flag is set to false, the software product when executed makes the feature(s) associated with that flag unavailable. This provides software developers the ability to control whether features included in a deployed/released code base are available or unavailable to customers (i.e. end users of the software product).

The use of feature flags can provide a number of advantages. For example, feature flags allow software developers granular control over how a given feature is actually made available to customers. Using a feature flag, delivery of a feature may be controlled, for example, to specific customers, customers in a specific user tier, customers in a particular geographic region, customers with a particular product configuration, a set number/percentage of random customers. This allows for software testing and user acceptance testing by a selected group or segment of customers before the feature is rolled out to a wider customer base. As another example, where availability of a feature is controlled by a feature flag, the feature can easily be rolled back (made unavailable) in the event that customer feedback is sufficiently negative or an issue with the feature is identified.

Various software products/systems have been developed to assist with using feature flags—for example LaunchDarkly and Rollout. For ease of reference, products/systems such as these will be referred to as feature flag systems. In LaunchDarkly, for example, roll out of a feature is controlled by customizable target rules which dictate when, and to what users/user groups, features behind feature flags made available.

While feature flag systems are useful, making sure that relevant information on a feature roll out/back is available to relevant stakeholders in an efficient and convenient manner can be problematic.

For example, the stakeholders involved in the release/intended release of a given feature could include: conception stakeholders who conceive the feature; development stakeholders who develop the feature; quality assurance stakeholders who review/test the feature; release approval stakeholders who approve the source code in respect of the feature for release (i.e. inclusion in the deployed version of the product's the code base); roll-out approval stakeholders who approve the feature for actual activation/roll out to one or more customers; marketing stakeholders responsible for promoting the launch of the feature; support stakeholders offering customer support for the feature once rolled out.

Providing the most up to date information around feature roll out to a potentially large group of stakeholders can be difficult. For example, consider a customer who is seeking support for a software product, but support cannot tell what features are enabled/disabled in that customer's product. In this case support's ability to assist the customer is compromised. As another example, consider a scenario where marketing is planning a launch campaign around a particular feature but cannot tell whether the feature has been made available to no end users, some end users, or all end users. As a further example, consider a conception or developer stakeholder who simply wants to see whether a feature they were involved in has been rolled out. They may (or may not) be able to easily determine whether the source code in respect of the feature has been deployed to a production environment, but where the feature is behind a feature flag this does not necessarily mean that the feature has been rolled out to/activated for any customers.

Generally speaking, embodiments described in this section provide for issues to be associated with feature flags in the issue tracking system. In certain embodiments this allows feature flag information in respect of an issue to be provided directly by the issue tracking system (e.g. in a user interface thereof). In certain embodiments it additionally (or alternatively) facilitates direct access from the issue tracking system to a specific feature flag in the feature flag system.

Operations for associating an issue with a feature flag will initially be described, followed by operations for updating an issue with feature flag event information, then operations involved in user interaction with an issue that has been associated with feature flag information.

Association of Issues and Feature Flags

This section describes the processing performed in order to associate an issue maintained by IT server system 120 with a feature flag managed by FF server system 130. The embodiments will be described with reference to Jira being the IT system and LaunchDarkly being the FF system. The principles and features described, however, may be applied to different IT and/or FF systems.

In certain embodiments, an IT system user goes through an initial configuration process in order to configure their IT client 112/account to be able to receive information from the FF server system 130. The precise way in which this is done will depend on the IT server system 120 and FF server system 130 in question, and the manner in which communication between the systems is to be achieved.

In certain embodiments, the FF server system 130 is configured to communicate with the IT sever system 120 via API calls. In this case, configuring access for the FF server system 130 involves configuring the IT server system 120 to permit incoming API calls from the FF system 130.

Once the IT system 120 has been configured, the user can associate issues maintained by the IT system (e.g. by the IT server system 120 storing data on the IT data store 124) with feature flags managed by the FF system.

Figure 3:
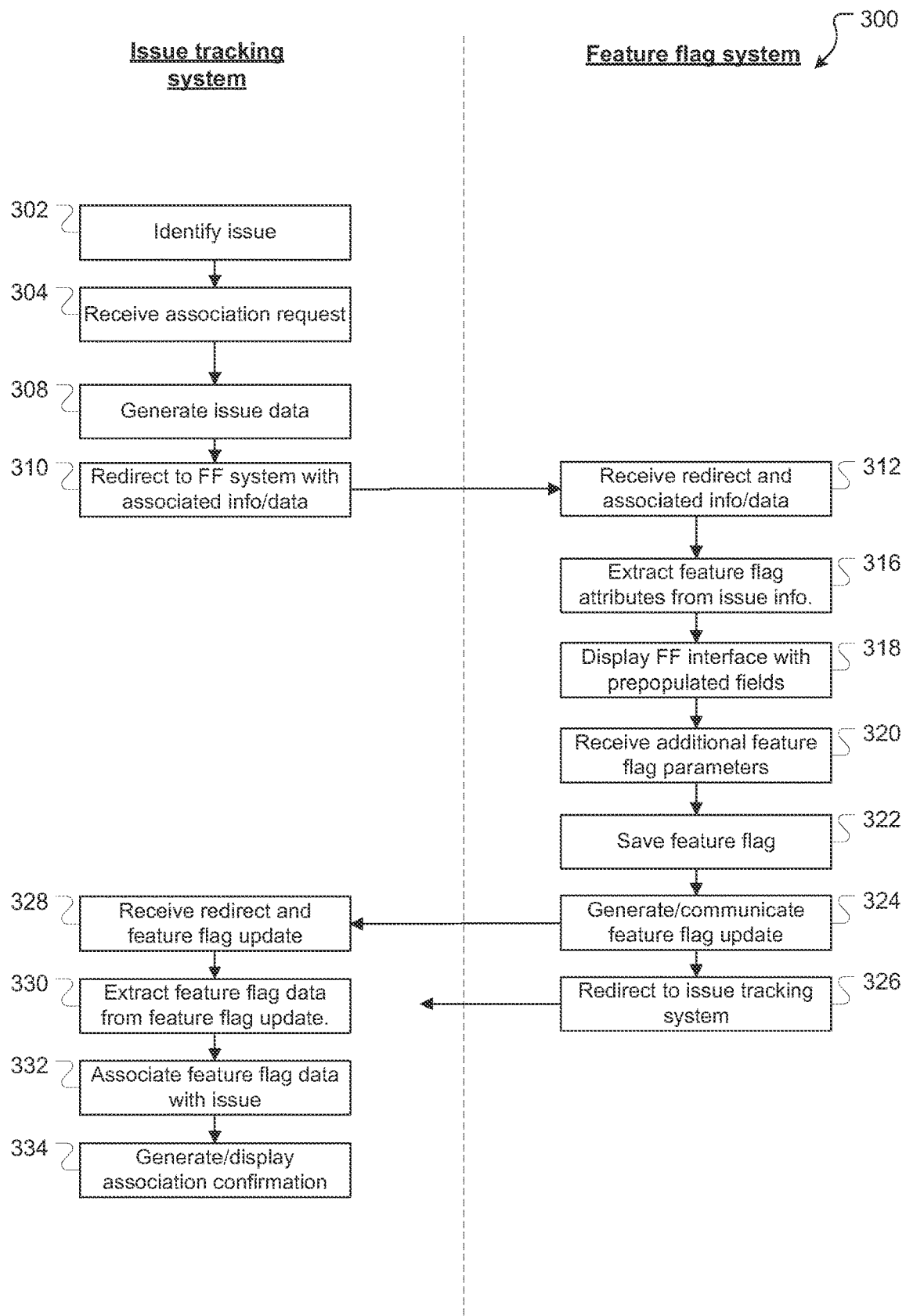
FIG. 3 is a flowchart indicating operations performed to associate an issue maintained by an issue tracking system with a feature flag maintained by a feature flag system.

FIG. 3 provides a flowchart 300 illustrating operations performed in accordance with certain embodiments to create issue/feature flag associations.

FIG. 3 is generally divided into operations performed by the IT system (i.e. the IT client 112, the IT server 122, and IT data store 124) and operations performed by the FF system (i.e. the FF client 114, the FF server 132, and FF data store 134).

The operations in flowchart 300 (and flowcharts 500 and 600 below) involve generation, communication, and use of various issue data and feature flag data. For convenience, the following naming convention will be used: issue information used/stored by the IT system will be referred to as ITS issue data; issue information used/stored by the FF system will be referred to as FFS issue data; feature flag information used/stored by the FF system will be referred to as FFS feature data; and feature flag information used/stored by the IT system will be referred to as ITS feature data.

Furthermore, where the FF server 132 is described as storing FFS issue data in the FF data store 134, the data stored may be data extracted directly from the FFS issue data or generated based on the FFS issue data. Similarly, where the IT server 122 is described as storing ITS feature data in the IT data store 124, the data stored may be data extracted directly from the ITS feature data or generated based on the ITS feature data.

At 302, an issue that is to be associated with a feature flag is identified. Typically this identification will be achieved by user interaction with a user interface provided on the user device 110 by IT client 112 (in communication with IT server 122). Such interaction may be by normal IT system mechanisms, e.g. searching or browsing for a particular issue via a navigation interface.

At 304, the IT client receives (in response to operation of user device 110 by a user) receives an association request to associate the issue identified at 302 with a feature flag. In the present embodiment, an association request may be a request to associate the issue with a new feature flag or to associate the issue with an existing feature flag. In alternative embodiments only one or the other of these options may be provided.

Figure 4:
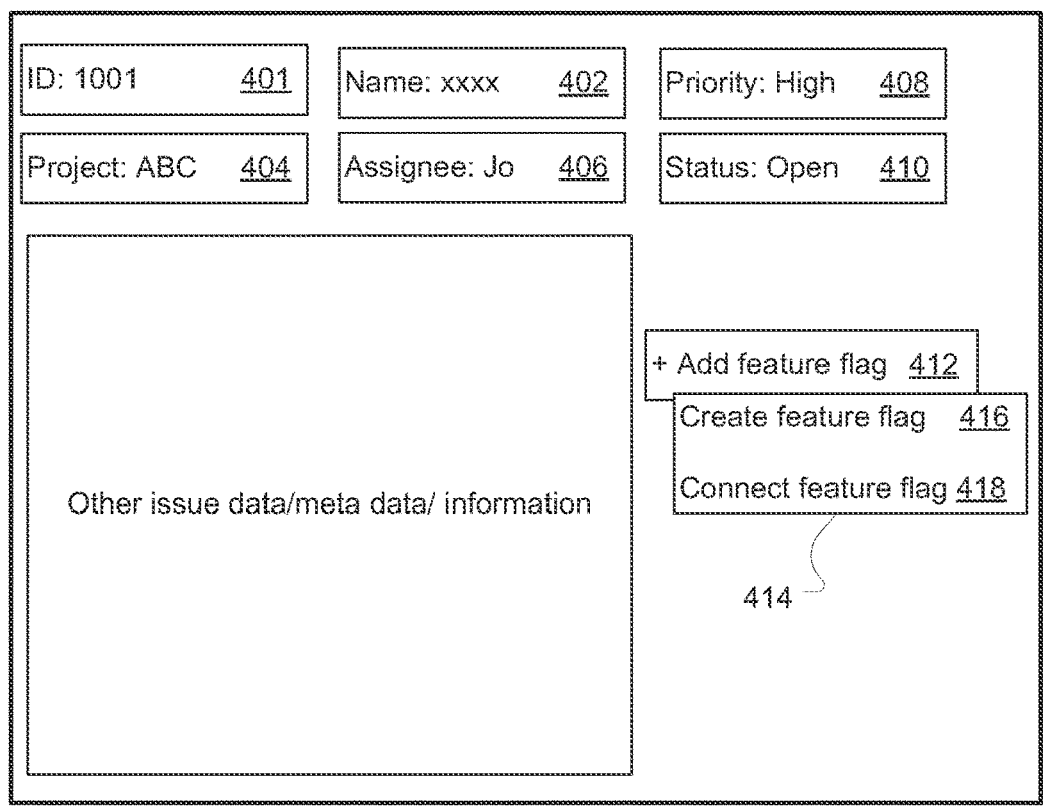
FIG. 4 is an example issue tracking system user interface for associating an issue with a feature flag.

FIG. 4 provides one example of an issue view user interface 400 configured to facilitate association of an issue with a feature flag. User interface 400 is generated by IT client 112 (drawing information such as ITS issue data from IT server 122) which causes the interface to be displayed by the user device 110 (e.g. on a display such as 212). User interface 400 generally includes ITS issue data such as a unique issue identifier 401, an issue name 402, a project name 404 (i.e. the parent project to which the issue belongs), an issue assignee 406, an issue priority 408 (e.g. highest, high, medium, low, lowest), an issue's workflow status 410 (e.g. open, in progress, reopened, resolved, closed). User interface 400 further includes user controls, including an feature flag association control 412 which in this case is provided with the text "+ Add feature flag"). In this embodiment when a user activates the feature flag association control 412 (e.g. by contacting, clicking, hovering, keyboard shortcut, or alternative interaction with the control) the IT client 112 is configured to generate a display a sub-menu 414 with two further controls: a create feature flag control 416 (activation of which is received as a request to associate the issue with a new feature flag) and a connect feature flag control 418 (activation of which is received as a request to associate the issue with an existing feature flag). Alternative user interfaces are, of course, possible, displaying additional and/or alternative ITS issue data and/or controls.

At 308, the IT system generates FFS issue data to be communicated to the FF server system 130 (either directly or via the FF client 114). As described below, the FFS issue data is used by the FF server system 130 to automatically populate information in the feature flag that is being created or connected to. The specific FFS issue data generated, therefore, depends on the IT/FF systems in question. By way of example, the FFS issue data may include an issue identifier/key and issue summary.

At 310, the IT system effects a redirect to the FF system. This redirection may be controlled by the IT client 112 or the IT server 122, and may be achieved in various ways depending on the nature of the IT and FF clients 112 and 114. For example, where the IT and FF clients 112 and 114 are both web clients (i.e. accessed from a single web browser application), redirection to the FF system is achieved in the browser—e.g. by opening a new tab with a URL pointing to the FF server system 130. Alternatively, where IT and FF clients 112 and 114 are dedicated application clients, redirection to the FF server system 130 may involve automatically launching/opening the FF client 114.

In certain embodiments, the redirect to the FF system at 310 is via a URL which includes the issue data generated at 308 as parameters.

For example, and returning to user interface 400 described above, activation of the create feature flag control 416 causes the IT system to generate and submit a URL to the FF system that includes issue data in respect of the issue currently being viewed—for example a URL such as: "https://FFsystem.com/integration/ITsystem/ create?issueKey={issue.key}" (the {issue.key} parameter being populated according to the key of the issue currently being viewed). Similarly, activation of the connect feature flag control 418 causes the IT system to generate and submit a URL to the FF system such as: "https://FFsystem.com/ integration/ITsystem/link?issueKey={issue.key}" (the {issue.key} parameter again being populated according to the key of the issue currently being viewed).

At 312, the FF server 132 receives the redirect and associated data from the IT system (e.g. the FFS issue data). Per the above example, the redirect may be to different pages served by the FF system. For example, the URL generated by the IT system when a user activates the create feature flag control 412 may point to a 'create new feature flag page' served by the FF system, while the URL generated by the IT system when a user activates the connect feature flag control 418 may point to a 'select existing feature flag page'.

At 316, the FF system processes FFS issue data received from the IT system (e.g. in the URL) to extract/generate based thereon feature flag attributes that will be associated with the feature flag that is to be created or edited. Generally, the FF server 132 will be configured to perform this processing, but in alternative embodiments the FF client 114 could be configured to do so.

At 318, the FF client 114 causes the user device 110 to display a feature flag interface. Per the above, where the association request was a request to associate the issue with a new feature flag, the feature flag interface will be an interface for creating a new feature flag. Where the association request was a request to associate the issue with an existing feature flag, the feature flag interface will be an interface for editing an existing feature flag. The existing feature flag may be identified based on information received from the IT system (e.g. as entered by the user via the IT client 112 and passed as a parameter in the redirection URL), or may be identified through user interaction with the FF client 114 (e.g. searching for or navigating to an existing feature flag via a user interface provided by the FF client 114).

The feature flag interface includes a number of data fields (some static, some user-editable) relating to attributes of the feature flag being generated/created. Data fields in respect of attributes extracted/generated at 316 are automatically pre-populated by the FF system with the data extracted/generated from the received issue information.

The specific feature flag attributes and data fields displayed in the feature flag interface will depend on the feature flag system being used. By way of specific example, feature flag attributes/data fields that are prepopulated include an issue identifier/key and an issue summary. Continuing with the above example, this information may be passed to the FF system 130 as query parameters in a URL.

At 320, the user interacts with the feature flag interface to define further attributes in respect of the feature flag being created/edited. The interaction required/possible here will, again, depend on the feature flag system being used. By way of example, however, the user may be able to configure various parameters of the feature flag such as: tags/labels for categorizing the feature flag; a feature flag type—e.g. a binary feature flag (which can only have an on/off or true/false state) or a multivariate feature flag (which allows for conditional logic to be applied to the feature flag); whether the flag is permanent or transitory; targeting parameters/rules (allowing specific users/user groups to be targeted).

In alternative embodiments, instead of interacting with the feature flag interface to define further parameters, the IT system may be configured to provide an interface (e.g. at 304) in which a user is requested a enter additional feature flag parameters. In this case the additional feature flag parameters are communicated to the FF server 132 (e.g. as part of the redirect) and prepopulated into the feature flag interface by the FF system.

At 322, the user interacts with the FF interface to save the feature flag being created/edited (e.g. by activating a save control or similar). This results in all feature flag information (e.g. attributes extracted/generated from the issue information at 316 and any attributes/parameters entered by the user at 320) being written to the FF data store 134.

At 324, the FF system generates a feature flag update which includes ITS feature data and communicates that update to the IT system.

The specific ITS feature flag data generated and the format of the update will depend on the particular IT and FF systems used. By way of one specific example, however, table A below provides an example feature flag update (in cURL format) that can be used to provide feature flag data to the Jira IT system:

TABLE A

Example feature flag update

```
curl --request POST \
  --url 'https://your-domain.atlassian.net/rest/featureflags/0.1/bulk' \
  --user 'email@example.com:' \
  --header 'Accept: application/json' \
  --header 'Content-Type: application/json' \
  --data '{
  "properties": {
    "accountid": "account-234",
    "projectid": "project-123"
  },
  "flags": [
    {
      "schemaversion": "1.0",
      "id": "111-222-333",
      "key": "my-awesome-feature",
      "updateSequenceId": 1523494301448,
      "displayName": "Enable awesome feature",
      "issueKeys": [
        "ISSUE-123"
```

TABLE A-continued

Example feature flag update

```
      ],
      "summary": {
        "url": "https://example.com/project/feature-123/summary",
        "status": {
          "enabled": true,
          "defaultvalue": "Disabled",
          "rollout": {
            "percentage": 80
          }
        },
        "lastUpdated": "2018-01-20123:27:25+00:00"
      },
      "details": [
        {
          "url": "https://example.com/project/feature-123/production",
          "lastUpdated": "2018-01-20123:27:25+00:00",
          "environment": {
            "name": "prod-us-west",
            "type": "production"
          },
          "status": {
            "enabled": true,
            "defaultvalue": "Disabled",
            "rollout": {
              "percentage": 80
            }
          }
        }
      ]
    }
  ]
}
```

The following paragraphs describe the API schema used in the feature flag update shown in Table A. It will be appreciated that this is by way of specific example only. Alternative schemas capturing additional, reduced, or alternative feature flag data (in the same or alternative ways) are possible.

The 'properties' object can be used to provide arbitrary properties that submitted feature flags are tagged with. These properties can be used, for example, for delete operations to clean up all feature flags associated with an account in the event that the account is removed.

The 'flags' array provides a list of feature flags and associated information (e.g. summary information and details information) to the IT system. Each feature flag may be associated with 1 or more IT system issue identifiers/keys, and will also be associated with any properties included in the request.

Each element of the 'flags' array is an object providing data related to a single feature flag, across any environment that the flag is present in.

The 'schemaVersion' string in the example 'flags' array element defines the FeatureFlagData schema version used for the feature flag data. Where no schema changes are anticipated (and there will only ever be one schema version) this string can be omitted.

The 'id' string in the example 'flags' array element provides the identifier for the feature flag (the identifier being unique for a given feature flag provider).

The 'key' string in the example 'flags' array element provides a key for users to use to reference the feature flag in their source code etc. The key can be made available via a user interface (as discussed below) for users to copy into their source code etc.

The 'updateSequenceId' integer in the example 'flags' array element provides an identifier that is used to apply an ordering to updates for the feature flag in the case of out-of-order receipt of update requests. In an example implementation, epoch millis from the FF system are used for the updateSequenceId. Other alternatives are, however, possible (e.g. a FF system store a counter against each feature flag and increment that on each update to the IT system). Updates for a Feature Flag that are received with an updateSequenceId lower than what is currently stored will be ignored.

The 'displayName' string in the example 'flags' array element provides a human-readable name for the feature flag. The displayName can be shown in the IT system UI as discussed below. The displayName string is optional, and if not provided the ID can be used for display.

The 'issueKeys' array in the example 'flags' array element provides one or more IT system issue keys to associate the feature flag information with.

The 'summary' object in the example 'flags' array element provides summary information for the feature flag. The summary object may be used in different ways. For example, the FF system may provide information from a specific environment, or may choose to 'roll up' information from across multiple environments—depending on what is appropriate for the FF system. The summary information can be presented in the IT system UI as discussed below.

In the 'summary' object, the 'url' string provides a URL that can be used use to link to a summary view of the feature flag if appropriate. This could be any location that is appropriate for the FF system—for example, if the summary information comes from a specific environment linking the user to the flag in that environment may be appropriate.

In the 'summary' object, the 'status' object provides status information that can be presented in the IT system UI (as described below).

In the 'status' object, the 'enabled' Boolean provides information on whether the feature flag is enabled in the given environment (or in summary). Enabled may imply a partial rollout, which can be described using the 'rollout' field.

In the 'status' object, the 'defaultValue' string provides the value served by the feature flag when it is disabled. This could be the actual value or an alias, as appropriate. This value may be presented in the IT system UI (as described below).

In the 'status' object, the 'rollout' object provides details of the rollout for the feature flag in an environment (or in summary). If 'enabled' is false, this field will be ignored. If 'enabled' is true, this field can be provided to describe the rollout. In certain implementations, if 'enabled' is true and the 'rollout' field is missing, rollout will be assumed to be 100%.

In the 'rollout' object, the 'percentage' number may be used to provide a percentage rollout (for where the feature flag rollout can be expressed as a simple percentage).

In the 'rollout' object, a 'text' string may be used to provide status information that represents the rollout and that can be displayed in the IT system UI. This could, for example, be a named cohort.

In the 'rollout' object, a 'rules' integer may be used to provide a count of the number of rules active for the feature flag in an environment.

Returning to the 'summary' object, the 'lastUpdated' string provides a timestamp that can be presented in the IT system UI as a summary of the state of the Feature Flag. The FF system may choose to supply the last-updated timestamp from a specific environment, or the 'most recent' last-updated timestamp across all environments—whatever is appropriate for the particular FF system.

Returning to the 'flags' array, each element of the array further includes a 'details' array providing detail information for the feature flag. Each element of the 'details' array is an object providing details of a feature flag in a single environment.

Each element in the example 'details' array includes a 'url' string defining a URL users can use to link to the feature flag in the environment.

Each element in the example 'details' array also includes a lastUpdated string providing a timestamp at which the feature flag was last updated in the environment.

Each element in the example 'details' array also includes an 'environment' object providing information on the environment that the details of the feature flag are in respect of. The 'environment' object includes a 'name' string providing the name of the environment and optionally a 'type' string providing a type or category of the environment (e.g. deployment, testing, staging, production).

Each element in the example 'details' array also includes a 'status' object providing information on the status of the feature flag in the environment. The 'status' object includes an 'enabled' Boolean indicating whether the feature flag is enabled in the given environment and a 'rollout' object (similar to or the same as the 'rollout' object described above).

At 326, the FF system redirects the user back to the IT system. This redirection may be controlled by the FF client 114 or the FF server 132.

At 328, the IT server 122 receives the feature flag update from the FF system.

At 330, the IT server 122 processes the ITS feature flag update to extract (or generate based thereon) feature data to be associated with the issue.

At 332, the IT server 122 associates the ITS feature data extracted/generated at 330 with the issue originally identified at 302. This involves the IT server 122 saving the ITS feature data in the IT data store 124.

At 334, the IT client 112 displays a confirmation message to the user that the issue has been associated with a feature flag. Additional information in respect of the association may be displayed.

The operations described are in respect of associating an issue with a feature flag. In certain embodiments, the IT and FF systems are configured to allow a single issue to be associated with multiple feature flags and/or a single feature flag to be associated with multiple issues. This can be useful, for example, where a single issue relates to multiple features that are implemented behind feature flags or a single feature implemented behind a feature flag is related to multiple issues.

Operations 300 described above are in the context of a user associating an issue with a feature flag by initial interaction with the IT system. In an alternative context, a user may associate an issue with a feature flag by initial interaction with the FF system. Where the user is initially interacting with the FF system, the operations described with respect to flowchart 300 above are (in a very general sense) reversed. For example, and at a high level: the user is initially interacting with a FF user interface (provided by the FF client 114); via the FF user interface, a user activates an issue association control which causes the FF user interface to package up relevant data and redirect the user to the IT system (communicating the packaged data to the IT system); the IT system receives the data, authenticates the user, and extracts/generates data for association with the issue in question; the issue data is saved at the IT system before the user is redirected back to the FF system; at the FF system issue data received from the IT system is saved against the feature flag and the association of the feature flag with the issue is completed.

Updating the Issue Tracking System with Feature Flag Information

Figure 5:
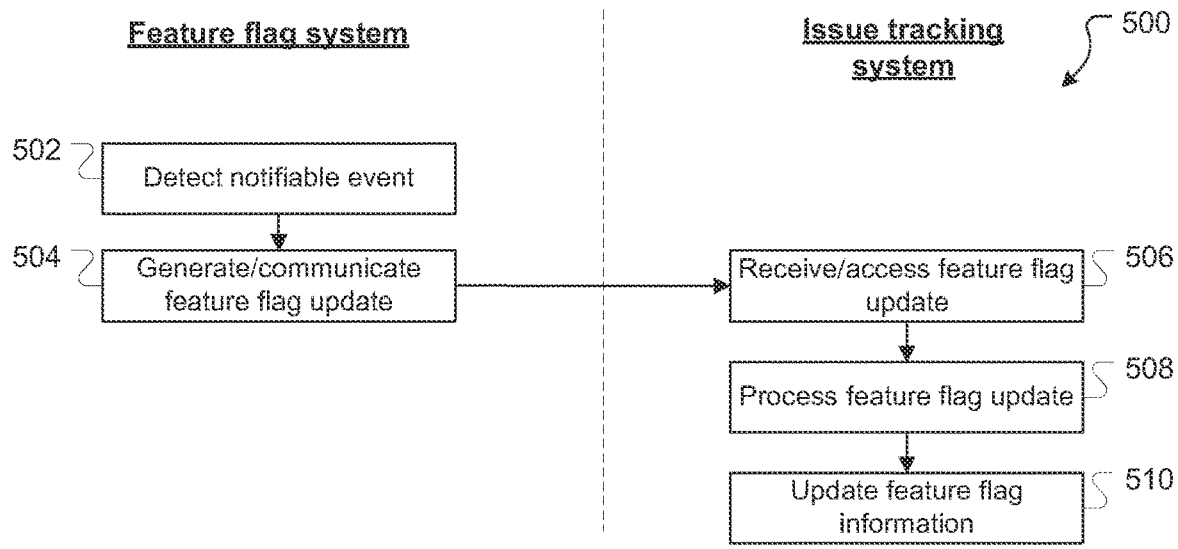
FIG. 5 is a flowchart indicating operations performed to update an issue tracking system with feature flag information.

Turning to FIG. 5, a flowchart 500 showing the operations performed to update the IT system when feature flag events occur at the FF system will be described. As with flowchart 300 above, flowchart 500 is divided into operations performed by the IT system and operations performed by the FF system. Furthermore, IT system operations will be described as being performed by the IT server 122 and FF system operations by the FF server 132. In some instances, however, operations may instead be performed by the IT client 112 or FF client 114 respectively.

At 502, the FF server 132 detects occurrence of a notifiable feature flag event. In this context, a notifiable event is an event of a predefined type that occurs in respect of a feature flag that is associated with an issue. In some embodiments, the FF server 132 is configured to treat any update/change to a feature flag that is associated with an issue as a notifiable event. In other embodiments, the FF server 132 is configured to treat only certain events as notifiable events— for example a feature flag being deleted (i.e. so the given feature is no longer controllable by a feature flag), a feature flag being switched on or off (e.g. so the feature behind the feature flag is made available to/withdrawn from one or more users/user groups), the target rules in respect of a feature flag being changed.

At 504, the FF server 132 generates a feature flag update and communicates the update to the IT server 122.

In certain embodiments the FF server 132 notifies the IT server 122 by generation/communication of an API call to the IT server 122—for example the feature flag update described above with respect to Table A. Alternative notification mechanisms may be used, however, for example a publication/subscription type mechanism or other notification mechanism.

At 506, the IT server 122 receives/accesses the feature flag update communicated by the FF server 132.

At 508, the IT server 122 processes the feature flag update to extract relevant information therefrom (or generate information based on information therein). The extracted/generated information includes issue identification information that allows the issue(s) that the update relates to be identified and event information in respect of the feature flag event that has occurred.

At 510, the IT server 122 uses the information extracted from the feature flag update to update one or more issues maintained by the IT system. This involves saving the extracted/generated feature flag information to the IT data store 124, and associating the feature flag information with the relevant issue(s).

Table B provides an example API call that can be used (e.g. by the FF server 132) to cause the IT server 132 to delete feature flag data currently stored by the IT system based on a feature flag identifier:

TABLE B

Example for deleting feature flag information by ID curl --request DELETE \
 --url 'https://your-domain,atlassian.net/rest/featureflags/0.1/flag/{featureFlagId}' \
 --user 'email@example.com: <api_token>'

The cURL of Table B includes a 'featureFlagId' string which defines the feature flag(s) to be deleted. On receiving the call the IT server 122 identifies issues with feature flag information in respect of the feature flag identified and deletes the feature flag information from those issues.

By way of further example, Table C provides an example API call that can be used to cause the IT server 122 to delete feature flag data currently stored by the IT system based on feature flags with one or more properties (e.g. as define by the 'properties' object in a feature flag update).

TABLE C

Example for deleting feature flag information by property curl --request DELETE \
 --url 'https://your-domain.atlassian.net/rest/featureflags/0.1/bulkByProperties' \
 --user 'email@example.com: <api_token>'

In this case one or more properties are defined (e.g. DELETE /bulkByProperties?accountId=<123>&createdBy=<456>). On receiving the call the IT server 122 identifies issues with feature flag information matching all defined properties and deletes the feature flag information from those issues.

In some implementations, an updateSequenceId may also be used to control deletion of feature flag information (either by ID or by properties). In this case, only stored data with an updateSequenceId less than or equal to that provided will be deleted. This can be used help ensure submit/delete requests are applied correctly if issued close together.

Querying Feature Information Maintained by the IT System

Mechanisms are also provided to query feature flag information maintained by the IT system. In certain embodiments this is also enabled by an API call, an example of which is provided in Table D below:

TABLE D

Example request for feature flag information stored by IT system curl --request GET \
 --url 'https://your-domain.atlassian.net/rest/featureflags/0.1/flag/{featureFlagId}' \
 --user 'email@example.com:<api_token>' \
 --header 'Accept: application/json'

Deleting Feature Flag Information from the IT System

Mechanisms are also provided to delete feature flag information from the IT system.

In this example, the feature flag information is identified by a featureFlagId. In response to a valid Get feature flag information call, the IT server 122 identifies and returns the feature flag information associated with the specified featureFlagId (for example using the feature flag update schema described in table A above).

Issue Display and Interaction Including Feature Flag Information

Figure 6:
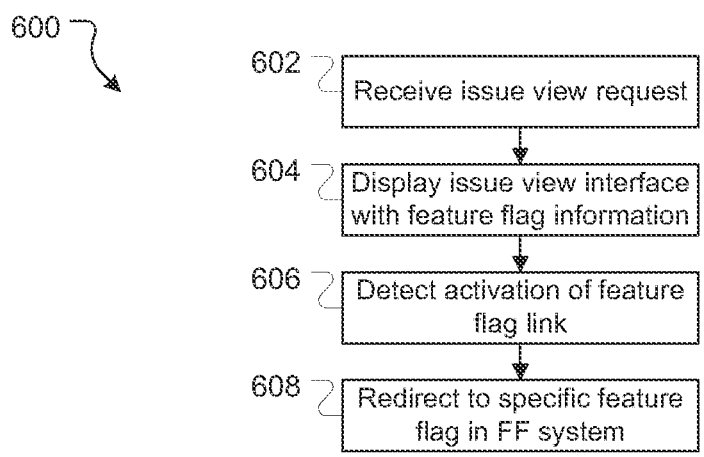
FIG. 6 is a flowchart indicating operations performed to view and interact with feature flag information at an issue tracking system.

FIG. 6 is a flowchart 600 of operations performed by an IT system in displaying an issue that has been associated with feature flag information and facilitating interaction therewith.

At 602, the IT system receives a request to view an issue associated with a feature flag. Such interaction may be made through typical IT system mechanisms, e.g. an issue search/browsing interface provided via the IT client 112.

At 604, the IT client 112 causes the user device 110 to display an issue view interface. Amongst other issue information, the issue view interface provides certain ITS feature information that is associated with the issue. The ITS feature information displayed is drawn from the IT data store 124. Displaying feature flag information in the IT system issue view interface allows users of the IT system to see certain feature flag information without having to navigate to or otherwise access the FF system.

The IT system may be configured to display various feature flag information in the issue view. The specific information that can be displayed will depend on the implementation that the information that the FF system provides to the IT system (for example in a feature flag update as described above with respect to Table A).

Continuing the example of Table A, and in certain embodiments, the issue view interface may display one or more of: a display name (i.e. a human defined name for the feature flag other than its unique identifier); a URL linking to summary information; feature flag status information that indicates whether the feature flag associated with the issue is on or off; feature flag rollout information that provides an indication of the extent of the feature flag roll out (for example a percentage of customers the feature has been rolled out to); feature flag rule information indicating for example the number of rules associated with the feature flag.

Where a feature flag is associated with different environments the feature flag information displayed may also include environment specific information. For example, if a particular feature flag has a development environment, staging environment, and production environment, information on the rollout/rules/etc. may be displayed for each different environment.

In certain embodiments, the IT system is further configured to display or provide a feature flag link. The feature flag link is configured to link directly to the specific feature flag that the issue is associated with in the FF system.

At 606, the IT client 112 detects activation of the feature flag link, for example by a user contacting, clicking on, or otherwise interacting with the link.

At 608, in response to detecting activation of the feature flag link, the IT system effects a redirect to the FF system, and in particular to an interface in respect of the specific feature flag indicated by the feature flag link/associated with the issue. As described above, this redirection may be performed in various ways. As part of the redirection the IT system (e.g. the IT server 122) provides credentials to the FF system (e.g. the FF server 132). This allows for automatic authentication of the user by the FF system (i.e. without requiring any further user interaction).

Figure 7:
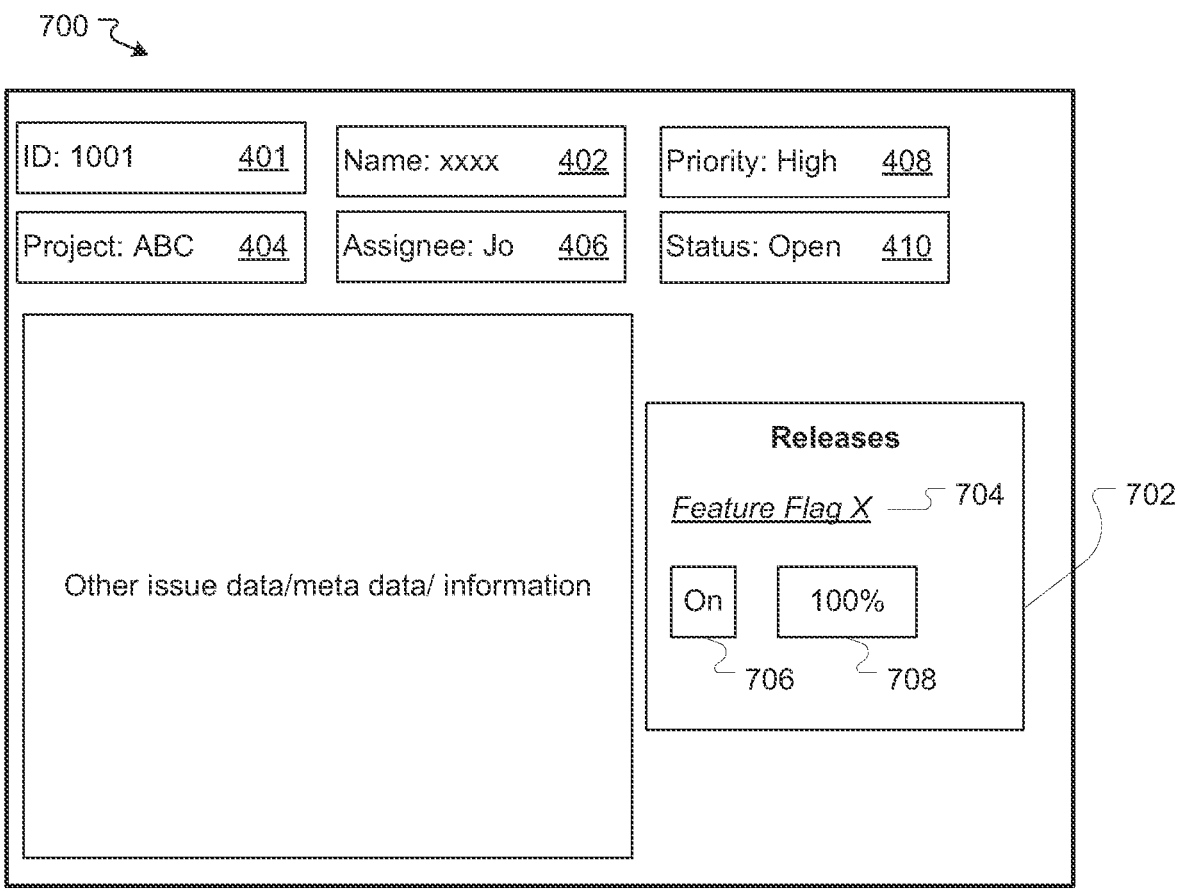
FIG. 7 is an example issue tracking system user interface for viewing/interacting with an issue that has been associated with feature flag information.

FIG. 7 provides one example of an IT system issue view user interface 700 in respect of an issue associated with a feature flag. As with issue view interface 400, interface 700 displays a number of general issue details (the same reference numerals have been used and these elements will not be described again).

User interface 700 further includes a releases section/pane 702. The releases pane 702 includes a feature flag link control 704, the text of which (in this instance) is the name or identifier of the feature flag. The link control 704 can be activated by a user (e.g. by clicking, contacting, or otherwise interacting) to cause the user to be redirected to the feature flag in the FF system.

Release pane 702 further includes a feature flag status indicator 706 which displays the feature flag status information—i.e. information indicating whether the feature flag is turned on or not. In this example the text of the status indicator 706 is 'On', indicating the feature flag is turned on (as opposed, for example, to 'Off' which would indicate the feature flag is turned off). In Release pane 702 further includes a roll out indicator 708 that displays the feature flag roll out information. In this particular example, the roll out indicator displays "100%", indicating the feature has been rolled out to all customers (as opposed to another number, e.g. n %, indicating that the feature has been rolled out to n % of customers). Roll out indicator 708 may be displayed in release pane 702 by default, or may be caused to be displayed by a user action (for example, hovering over or otherwise interacting with the roll out indicator 708).

Feature Flag Integration Example Embodiments

According to an embodiment of the disclosure, a computer implemented method comprises: receiving, by an issue tracking system, a request to associate an issue maintained by the issue tracking system with a feature flag maintained by a feature flag system; generating, by the issue tracking system, feature flag system issue data; effecting, by the issue tracking system, a redirect to the feature flag system and communicating the feature flag system issue data to the feature flag system; receiving, by the issue tracking system, a feature flag update from the feature flag system; processing, by the issue tracking system, the feature flag update to derive feature flag data therefrom; and associating, by the issue tracking system, the feature flag data with the issue.

Following the association of the feature flag data with the issue the method may further comprise: receiving, by the issue tracking system, a request to display the issue; generating, by the issue tracking system, an issue view user interface, the issue view user interface comprising issue display information and feature flag display information, the feature flag display information derived from the feature flag data; causing, by the issue tracking system, the issue view user interface to be displayed on a user device.

The feature flag display information may comprise feature flag status information indicating whether a feature associated with the feature flag has been made enabled or not.

The feature flag display information may comprise feature flag rollout information indicating the extent to which a feature associated with the feature flag has been rolled out.

The issue tracking system may comprise an issue tracking client operating on a user device and an issue tracking server operating on an issue tracking sever system, and: the request to view the issue may be received by the issue tracking client and communicated by the issue tracking client to the issue tracking server; the issue display information and feature display flag information may be received by the issue tracking client from the issue tracking server; and the issue view user interface may be caused to be displayed on the user device by the issue tracking client.

The feature flag system may comprise a feature flag client operating on the user device and a feature flag server operating on a feature flag sever system; the issue view user interface may further comprise a feature flag link; and the method may further comprise: detecting, by the issue tracking client, activation of the feature flag link; in response to detecting activation of the feature flag link: effecting, by the issue tracking system, a redirect to the feature flag system; receiving, by the feature flag client from the feature flag server, feature flag information in respect of the feature flag; and causing, by the feature flag client, a feature flag user interface to be displayed on the user device, the feature flag interface including the feature flag information.

The request may be a request to associate the issue with an existing feature flag.

The request may be a request to associate the issue with a new feature flag.

Communicating the feature flag system issue data to the feature flag system may comprise generating, by the issue tracking system, a redirect URL, the redirect URL comprising one or more parameters for conveying the feature flag system issue data.

Build System Integration

This section describes the integration of issue tracking systems with systems that manages builds. In the present examples, builds (and deployments as discussed further below) are managed by a single CID system 140. An example of such a CID system is Atlassian's Bamboo which allows users to create release workflows (involving building, testing and deployment) and automate the execution of those workflows. In alternative embodiments, builds may be managed by a build system (for example a continuous integration system) with deployments managed by a separate system (for example a continuous deployment system). As used herein, the term build system refers to a system which operates to manage builds (whether or not that system also manages other tasks, such as deployments).

As with feature flag systems, while systems that assist in managing builds are useful they involve a further system in the software development process and can make obtaining relevant information in respect of a software development project difficult.

Generally speaking, embodiments described in this section provide mechanisms for issues to be associated with builds and build information in the issue tracking system. In certain embodiments this allows build information in respect of an issue to be provided directly by the issue tracking system. In certain embodiments it additionally (or alternatively) facilitates direct access from the issue tracking system to a specific build in the system being used to handle builds.

The association of issues with builds will initially be described, followed by operations for updating an issue with build information, then operations involved in user interaction with an issue that has been associated with build information.

Association of Issues with Build Information

This section describes the manner in which issues maintained by IT server system 120 are associated with builds managed by (in this case) a CID system 140. The embodiments will be described with reference to Jira being the IT system and Bamboo being the CID system. The principles and features described, however, may be applied to different IT and/or CID (or dedicated build) systems.

In certain embodiments, an initial configuration process is performed in order to configure an IT client 112/account to be able to receive information from the CID server 142. The precise way in which this is done will depend on the IT server 122 and CID server 142 in question, and the manner in which communication between the systems is to be achieved.

In the embodiments described herein the CID server 142 is configured to communicate with the IT sever 122 via API calls. This involves configuring the IT server 122 to permit incoming API calls from the CID server 142.

In the present embodiments, the CID server 142 works in conjunction with a source code management system (not shown). Specifically, builds performed by the CID server 142 require source code which the CID server 142 is configured to retrieve from the source code management system. One example of such a source code management system is Atlassian's Bitbucket (though other systems exist, for example Github and Gitlab to name two).

In this environment, associations between issues maintained by the IT server system 120 and source code managed by the source code management system can be achieved by including issue identifiers in relevant source code management system actions or events. By way of example: a source code management commit may be linked to an IT system issue by including the issue identifier/key in the commit message; a source code management branch may be linked to an IT system issue by including the issue identifier/key in the branch name; a source code management pull request may be linked to an IT system issue by including the issue identifier/key in the pull request's title and/or the source branch name.

When a source code management system action/event associated with a particular issue occurs, the source code management system makes information in respect of the event available to the IT server 122, for example by use of an API call which notifies the IT server 122 with information including the issue identifier(s) of the issue(s) in question as well as the event that has occurred (for example a branch, a merge, a commit, etc.). Correspondingly, the IT server 122 receives such updates and associates the provided information with the issue referenced by the issue identifier.

Returning to association of issue(s) maintained by the IT server 122 and build(s) performed by the CID server 142, when the CID server 142 performs a build it is based on source code maintained by the source code management system. The source code is identified by a particular commit identifier. If the commit message (or other data) associated with the commit identifier includes one or more IT system issue identifiers/keys, the CID server 142 can identify the associated issue(s) from the commit message (or other data).

Where the system handling builds is not integrated with a source code management system, issues may be identified in other ways. For example, when configuring a build a user can manually associate the build (or the source code on which the build is based) with one or more issue identifiers. Any means of association may be used, for example a dedicated build attribute or variable or other association mechanism.

Updating Issue Tracking System with Build Information

Figure 8:
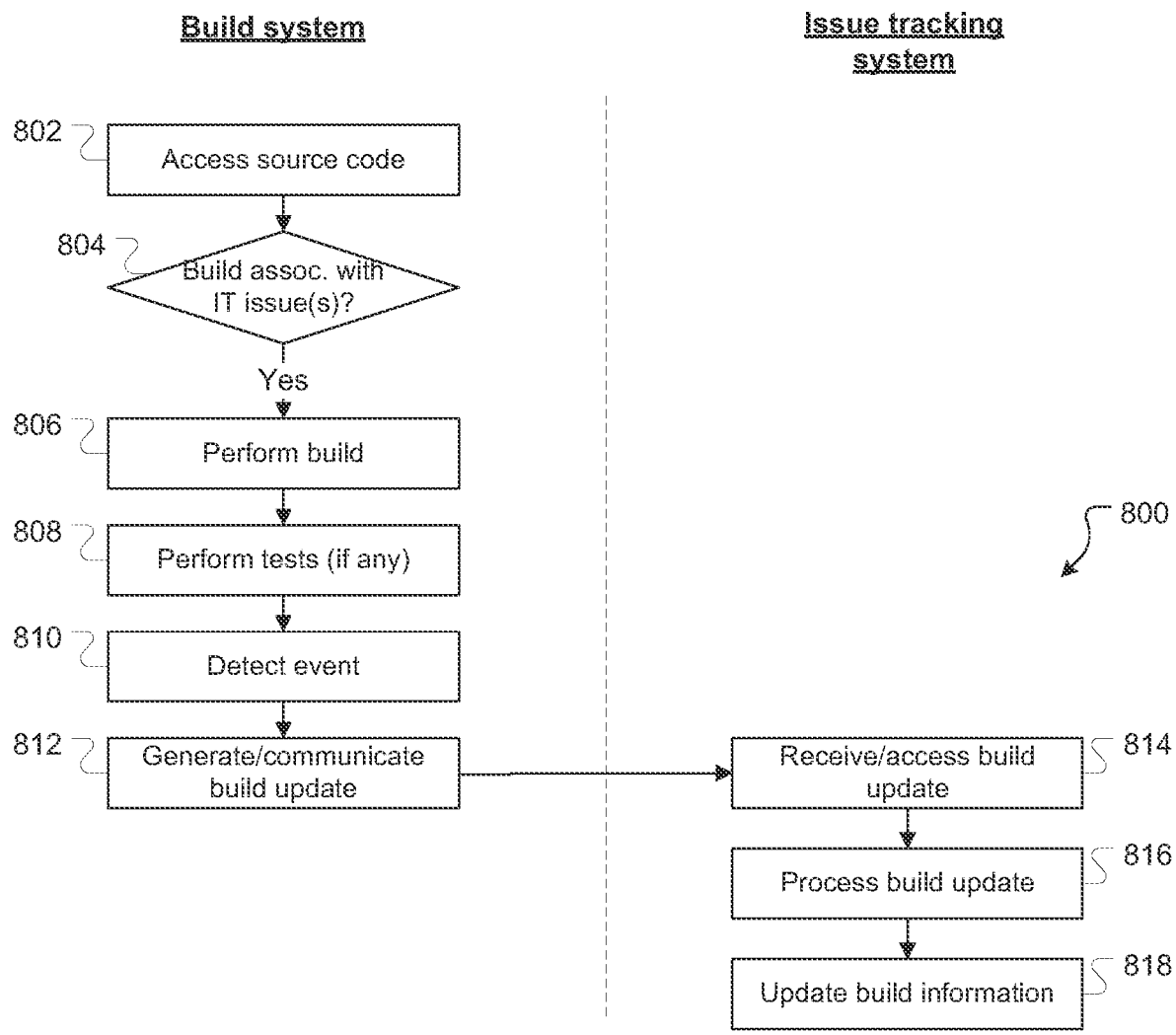
FIG. 8 is a flowchart indicating operations performed to update an issue tracking system with build information.

Turning to FIG. 8, a flowchart 800 showing the operations performed to update the IT system when build events occur at/are performed by the CID server 142 will be described.

At 802, the CID server 142 accesses source code on which a build is to be performed. In the embodiments described herein, the source code is accessed from a source code management system (e.g. Bitbucket, Github, or an alternative source code management system) (not shown). The source code is accessed using a source code identifier, for example a commit identifier or the like. In alternative embodiments source code may be accessed by or provided to the CID server 142 by alternative means.

At 804, the CID server 142 determines whether the build is associated with any issues maintained by the IT system. As discussed above, determining whether the build is associated with any IT system issues may, for example, be performed by checking whether information associated with the source code accessed at 802 is associated with any IT system issues (e.g. by inclusion of IT system issue identifiers in a commit message or the like).

If the build is not associated with any issues maintained by the IT system, the present process ends. In this case the CID server 142 continues the build process normally however does not generate a build update to be communicated to the IT server 122.

If the build is associated with one or more issues maintained by the IT system, processing continues to 806. At 806, the CID server 142 performs the build.

At 808, and if part of the build process/pipeline, the CID server 142 performs tests on the build.

At 810, the CID server 142 detects occurrence of a notifiable build event. The CID 142 may be configured to nominate any build event as a notifiable build event (insofar as the event is simply a trigger for generating and communicating a build update). Typically, however, a notifiable build event will be that a build has completed successfully or a build has failed.

At 812, in response to detecting a notifiable build event has occurred, the CID server 142 generates a build update and communicates the build update to the IT server 122.

The specific information generated for inclusion in a build update, and the manner in which it is communicated to the IT server 122, will depend on the particular IT and CID (or build) systems used. In the present embodiments, build updates are communicated by way of an API call. Table E below provides a specific example of a build information update (in cURL format) that can be used to provide build data to the Jira IT system:

TABLE E

Example build information update

```
curl --request POST \
  --url 'https://your-domain.atlassian.net/rest/builds/0.1/bulk' \
  --user 'email@example.com:' \
  --header 'Accept: application/json' \
  --header 'Content-Type: application/json' \
  --data '{
"properties": {
   "accountId": "account-234",
   "projectid": "project-123"
},
"builds": [
   {
     "schemaversion": "1.0",
     "pipelineId" : "my-build-plan" ,
     "buildNumber": 16,
     "updateSequenceNumber": 1523494301448,
     "displayName": "My Project build #16",
     "description": "My Project build #16: Failed",
     "label": " ",
     "url": " ",
     "state": "failed",
     "lastUpdated": "2018-01-20123:27:25+00:00",
     "issueKeys": [
        "ISSUE-123"
     ],
     "testInfo": {
        "totalNumber": 150,
        "numberPassed": 145,
```

TABLE E-continued

Example build information update

```
        "numberFailed": 5,
        "numberSkipped": 0
     },
     "references": [
        {
          "commit": {
             "id": "08cd9c26b2b8d7cf6e6af6b49da8895d065c259f",
             "repositoryUri": "https://bitbucket.org/atlassian/biij-vendor-api"
          },
          "ref": {
             "name": "feature/ISSUE-123-some-work",
             "uri": "https://bitbucket.org/atlassian/biij-vendor-api/refs/feature/ISSUE-123-some-work"
          }
        }
     ]
   }
  ]
}
```

The following paragraphs describe the API schema used in the build information update shown in Table E. It will be appreciated that this is by way of specific example only. Alternative schemas capturing additional, reduced, or alternative build information/data (in the same or alternative ways) are possible.

The 'properties' object can be used to provide arbitrary properties that submitted builds are tagged with. These properties can be used, for example, for delete operations to clean up all build information associated with an account in the event that the account is removed.

The 'builds' array provides a list of builds and associated information that are submitted to the IT system. Each build may be associated with 1 or more IT system issue identifiers/keys, and will also be associated with any properties included in the request.

Each element of the 'builds' array is an object providing data related to a single (distinct) build.

The 'schemaVersion' string in the example 'builds' array element is used to define the schema version used for the build update. Where no schema changes are anticipated (and there will only ever be one schema version) this string can be omitted.

The 'pipelineId' string in the example 'builds' array element provides a build sequence identifier which is used to relate a sequence of builds. This could, for example, be a project identifier, a pipeline identifier, a plan key, or any other identifier used to group a sequence of builds.

The 'buildNumber' integer in the example 'builds' array element is used to identify a particular build in the sequence of builds identified by the pipeplineId string. It can be used to identify the most recent build in the sequence of builds.

Together, the 'pipelineId' and 'buildNumber' provide build identify information to identify a build.

The 'updateSequenceId' integer in the example 'builds' array element is used to provide an identifier that is used to apply an ordering to updates to the build (as identified by the 'pipelineId' and 'buildNumber'). This is similar to the 'updateSequenceId' in the example feature flag update described above.

The 'displayName' string in the example 'builds' array element is used to provide a human-readable name for the build.

The 'description' string in the example 'builds' array element is optional and can be used to provide a description.

The 'label' string in the example 'builds' array element can be used to provide further (human-readable) information in respect of the build.

The 'url' string in the example 'builds' array element is used to provide a URL to the build in the CID system 140.

The 'state' string in the example 'builds' array element is used to provide the state of the build. This may, for example, be pending, in_progress, successful, failed, cancelled, unknown, and/or any other relevant deployment state.

The 'lastUpdated' string in the example 'builds' array element is used to provide a timestamp at which the state of the build was provided.

The 'issueKeys' array in the example 'builds' array element is used to provide one or more IT system issue keys to associate the build information with. As discussed above, issue keys may be identified/extracted from data associated with the source code on which the build was performed (e.g. a commit message or the like).

The 'testInfo' object in the example 'builds' array element is used to provide optional information in respect of tests executed during the build.

In the 'testInfo' object, the 'totalNumber' integer is used to provide the total number of tests considered during the build.

In the 'testInfo' object, the 'numberPassed' integer is used to provide the number of tests that passed during the build.

In the 'testInfo' object, the 'numberFailed' integer is used to provide the total number of tests that failed during the build.

In the 'testInfo' object, the 'numberSkipped' integer is used to provide the total number of tests that were skipped during the build.

The 'references' array in the example 'builds' array element is optional and can be used to provide information that links a build to source code system information (e.g. a commit, a branch or other information). Each item of the references array is an object that includes a commit object and a ref object.

The commit object of the references array element provides details about the commit that the build was run against. The commit object includes an id string which provides the ID of the commit (for example, for a Git repository this would be the SHA1 hash), and a repositoryUri string used to identify the repository containing the commit (i.e. the source code on which the build was based). In most cases the repositoryUri will be the URL of the repository in the source code management system provider. For cases where the build was executed against a local repository (for example) the repository URI is used to provide a unique identifier for the repository.

The ref object of the references array element provides details about the ref (for example branch, tag, etc.) the build was run on. The ref object includes a name string which is used to provide the name of the ref the build ran on and a uri string which identifies the ref (e.g. the URL of the tag/branch in question).

At 814, the IT server 122 receives/accesses the build update communicated by the CID server 140.

At 816, the IT server 122 processes the build update to extract relevant information therefrom (or generate information based on information therein). The extracted/generated information includes issue identification information that allows the issue(s) that the update relates to be identified and build information in respect of the build event(s) that has/have occurred.

At 818, the IT server 122 uses the information extracted from the build update to update one or more issues maintained by the IT system. This involves saving the extracted/generated build information to the IT data store 124, and associating the build information with the relevant issue(s).

Deleting Build Information from the IT System

Mechanisms are also provided to delete build information from the IT system.

Table F provides an example API call that can be used (e.g. by the CID system) to cause the IT server 122 to delete build information currently stored by the IT system based on a build key:

TABLE F

Example for deleting build data by key curl --request DELETE \
  --url 'https://your-domain.atlassian.net/rest/builds/0.1/pipelines/{pipelined}/builds/{buildNumber}' \
  --user 'email@example.com:<api_token>'

The delete by key API call requires both a pipelineID and buildNumber in order to identify the build data that is to be deleted. On receiving the call the IT system identifies the specified build information (i.e. build information with the specified pipelineId and buildNumber) and deletes it.

By way of further example, Table G provides an example API call that can be used to cause the IT server 122 to delete build data currently stored by the IT system based on build information properties (e.g. as defined by the 'properties' object in a build update):

TABLE G

Example for deleting build data by properties curl --request DELETE \
  --url 'https://your_domain.atlassian.net/rest/builds/0.1/bulkByProperties' \
  --user 'email@example.com:<api_token>'

In this case one or more properties are defined (e.g. DELETE /bulkByProperties?accountId=<123>&createdBy=<456>).

On receiving the call the IT server 122 identifies the specified deployment information (i.e. build information matching all defined properties) and deletes it.

In some implementations, an updateSequenceId may also be used to control the deletion of build information (either by ID or by properties). In this case, only stored data with an updateSequenceId less than or equal to that provided will be deleted. This can be used help ensure submit/delete requests are applied correctly if issued close together.

Querying Build Information Maintained by the IT System

Mechanisms are also provided to query build information maintained by the IT system. In certain embodiments this is also enabled by an API call, an example of which is provided in Table H below:

TABLE H

Example request for build information stored by IT system

```
curl --request GET \
    --url 'https://your-
domain.atlassian.net/rest/builds/0.1/pipelines/{pipelineId}/builds/{buildNumber}' \
    --user 'email @ example.com:<api_token>' \
    --header 'Accept: application/json'
```

In this example, the build information is identified by a pipelineID and buildNumber. In response to a valid Get build information call, the IT server 122 identifies and returns the build information associated with the specified build (for example using the build update schema described in Table E above).

Issue Display and Interaction Including Build Information

Figure 9:
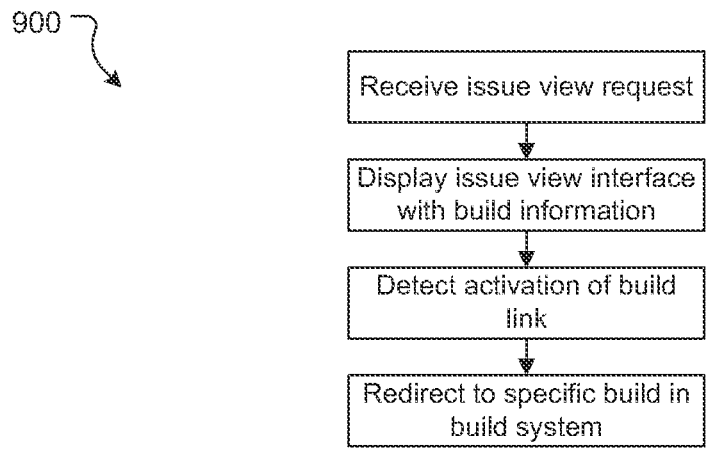
FIG. 9 is a flowchart indicating operations performed to view and interact with build information at an issue tracking system.

FIG. 9 is a flowchart 900 of operations performed by an IT system in displaying an issue that has been associated with build information and facilitating interaction therewith.

At 902, the IT system receives a request to view an issue associated with build information. Such interaction may be made through typical IT system mechanisms, e.g. an issue search/browsing interface provided via the IT client 112.

At 904, the IT client 112 causes the user device 110 to display an issue view interface which provides certain ITS issue information along with ITS build information (i.e. build information that the IT system has received from a CID system and saved to the IT data store 124). Displaying build information in the IT system issue view interface allows users of the IT system to see certain build information without having to navigate to or otherwise access the system performing/managing the build.

The IT system may be configured to display various build information in the issue view. The specific information that can be displayed will depend on the implementation and the build information communicated to the IT system (for example in a build update as described above with respect to Table E), any of which can be displayed by the IT system without having to access the CID (or build) system.

The IT system may be configured to display summary build information by default and allow user interaction to cause further/more detailed build information to be displayed. For example, and as described with respect to example UI 1000 below, the IT system may display build summary information that includes a number of builds associated with the issue and a build status: e.g. whether the most recent build associated with the issue passed or failed. In addition, the build summary information includes a detailed build information control which, when activated by a user provides more detailed build information (e.g. information on each of the builds associated with the issue and the individual statuses of those builds).

In certain embodiments, the IT system is further configured to display or provide a build system link. The build system link is configured to link directly to a specific build that the issue is associated with in the CID system 140. The build system link may be provided in a summary build view, a detailed build view, or in both views.

At 906, the IT client 112 detects activation of the build system link, for example by a user contacting, clicking on, or otherwise interacting with the link.

At 908, in response to detecting activation of the build system link, the IT client 112 (or server 122) effects a redirect to the CID system 140, and in particular to an interface in respect of the specific build indicated by the build link/associated with the issue. As described above, this redirection may be performed in various ways. As part of the redirection the IT system provides credentials to the CID system 140 allowing for automatic authentication of the user by the CID system 140 (i.e. without requiring any further user interaction).

In the present example, the build update also includes URLs to the source code management systems maintaining the source code on which the build was based (e.g. in the commit and ref objects of the references array). These URLs can also be displayed such that when their activation is detected the IT system links to the source code management system—e.g. to the commit on which the build was based.

Figure 10A:
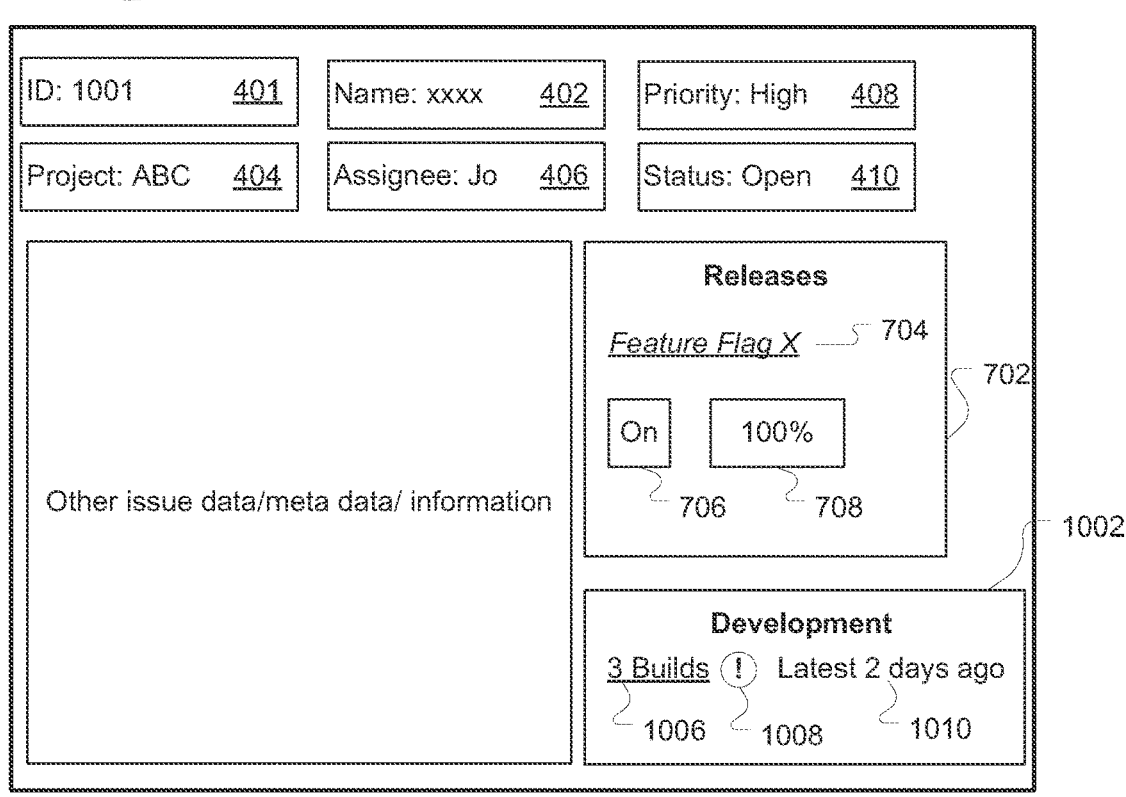
FIG. 10A and FIG. 10B provide an example issue tracking system user interface for viewing/interacting with an issue that has been associated with build information.
Figure 10B:
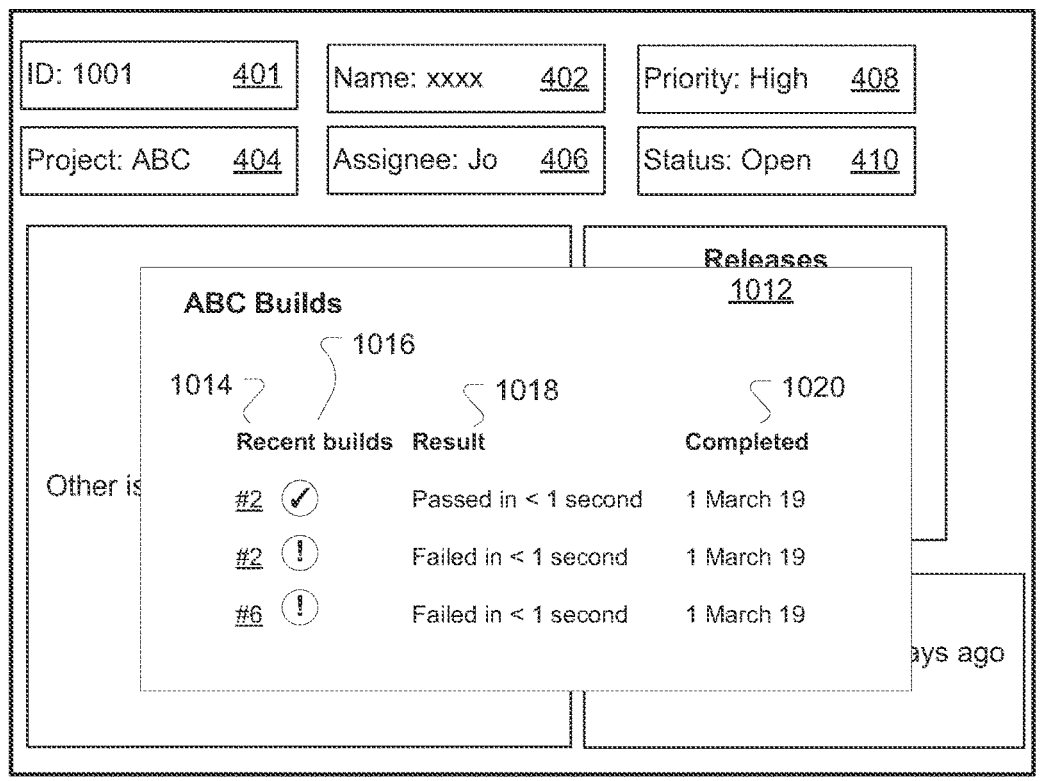

FIGS. 10A and 10B provide an example of an IT system issue view user interface 1000. Interface 1000 is in respect of an issue associated with build information. As with issue view interface 400, interface 1000 displays a number of general issue details (the same reference numerals have been used and these elements will not be described again).

User interface 1000 further includes a development section/pane 1002. The development pane 1002 includes a build summary 1004 which, in this instance, includes build summary text 1006 indicating the number of builds associated with the issue (in this case 3 builds), a build status indicator 1008 (in this case an exclamation mark indicating that the most recent build failed), and build currency information 1010 indicating when the build information was last updated (in this case 2 days ago). The build status could alternatively indicate that the most recent build associated with the issue was successful (for example by displaying a tick). The build summary includes a detailed build information control, which in this case is provided by summary text 1006 being a hyperlink.

When the detailed build information control is activated by a user (e.g. by clicking, hovering, contacting or any other means) detailed build information is displayed. FIG. 10B provides an example of this, in which detailed build information is displayed in a build detail dialogue 1012 that is displayed atop the issue view. In this example, the build detail dialogue 1012 displays recent builds 1014 (e.g. the n most recent builds for which build information is available, provided by the buildNumber field of the build update), a build status indicator 1016 (provided by the state field of the build update) indicating whether the build was successful (in this case indicated by a tick) or not (in this case indicated by an exclamation mark), result text 1018 providing information on the build, and a build completion time 1020 (provided by the lastUpdated field of the build update) indicating when the build was completed. In the illustrated example the result text simply indicates passed/failed. Where stored by the IT system, additional or alternative information can be displayed, for example the number of tests that passed and/or the number of tests that failed.

In the example build detail dialogue 1012, the build number 1016 is a build system link (e.g. hyperlink) which can be activated by a user to cause the user to be redirected to the particular build in the build system.

Any other deployment information received in a deployment update and stored by the IT system can be displayed in the IT system UI.

Build System Integration Example Embodiments

According to an embodiment of the present disclosure, a computer implemented method comprises: receiving, by an issue tracking system, a build update from a build system, the build update including build information in respect of one or more issues maintained by the issue tracking system; associating, by the issue tracking system, one or more issues maintained by the issue tracking system with build information by: processing, by the issue tracking system, the build update to identify the one or more issues to which the build information in the build update relates; extracting, by the issue tracking system, the build information from the build update; and associating, by the issue tracking system the build information with each of the identified issues.

The build update may include a plurality of build objects, each build object including distinct build information, and wherein associating, by the issue tracking system, one or more issues maintained by the issue tracking system with build information may comprise: processing, by the issue tracking system, the build update to identify the one or more build objects included therein; and for each build object identified: identifying one or more issues to which the build information included in the build object relates; extracting the build information from the build object; and associating the build information with each of the issues identified.

The build information in respect of one or more issues may include: build identifying information identifying a particular build that was performed by the build system; and state information in respect of the particular build.

The particular build may be a build performed by the build system based on source code related to the one or more issues that the build information in the build update is in respect of.

The build update may include an identifier of the source code on which the build performed by the build system was based.

The build identifying information may include a build sequence identifier defining a build sequence and a build number identifying a position in the build sequence.

The build information may include test information in respect of one or more tests performed by the build system on the particular build.

Following the association of build information with one or more issues, the method may further comprise; receiving, by the issue tracking system, a request to display a particular issue that has been associated with build information; generating, by the issue tracking system, an issue view user interface, the issue view user interface comprising issue information and build display information, the build display information derived from the build information associated with the issue; causing, by the issue tracking system, the issue view user interface to be displayed on a user device.

The build display information may include a build system link and the method may further comprise: detecting activation of the build system link; and in response to detecting activation of the build system link effecting, by the issue tracking system, a redirect to the build system.

According to another embodiment of the present disclosure, a computer implemented method comprises: accessing, by a build system, source code from a source code management system; performing, by the build system, a build based on the source code; generating, by the build system, a build update, the build update identifying an issue maintained by an issue tracking system and including build information in respect of the performed build; communicating, by the build system, the build update to the issue tracking system.

The build system may access the source code from the source code management system using a source code identifier, and wherein prior to generating the build update the method may further comprise: determining, by the build system, whether the source code identifier is associated with an issue maintained by the issue tracking system; and in response to determining that the source code identifier is associated with an issue maintained by the issue tracking system, generating the build update.

Deployment System Integration

This section describes the integration of issue tracking systems with a system that manages deployments. In the present examples, and as mentioned above, deployments are managed by CID system 140. Deployments could however be managed by an alternative and/or independent system. As used herein, the term deployment system refers to a system for managing deployments (whether or not that system also manages other tasks, such as deployments).

Generally speaking, embodiments described in this section provide for issues to be associated with deployments and deployment information in the issue tracking system: for example whether source code associated with an issue has been deployed and, if so, to what environment (e.g. a test environment, a production environment, an alternative environment). In certain embodiments this allows deployment information in respect of an issue to be provided directly by the issue tracking system. In certain embodiments it additionally (or alternatively) facilitates direct access from the issue tracking system to a specific deployment in the system being used to handle deployments.

Operations for associating issues with deployments and deployment information will initially be described, followed by operations for updating an issue with deployment information, then operations involved in user interaction with an issue that has been associated with deployment information.

Association of Issues with Deployment Information

This section describes the manner in which issues maintained by IT server system 120 are associated with deployments managed by (in this case) a CID system 140. The embodiments will be described with reference to Jira being the IT system and Bamboo being the CID system. The principles and features described, however, may be applied to different IT and/or CID (or dedicated deployment) systems.

In the context of Jira being the IT system and Bamboo being the CID system, the initial configuration is as discussed with respect to the integration of these systems above (with respect to builds). Specifically, the CID sever system 140 is configured to communicate with the IT sever system 120 via API calls and the IT server system 120 is configured to permit incoming API calls from the CID system 140.

The manner in which deployments managed by the CID system 140 are associated with issues maintained by the IT system in this example is similar to the association of builds with issues described above. Specifically, deployments performed by the CID system 140 are based on an artefact (e.g. a build) which, in turn, is generated based on source code. The source code is identified by a particular commit identifier. If the commit message (or other data) associated with the source code includes one or more IT system issue identifiers/keys, the CID system 140 can identify the associated issue(s) from the commit message (or other data).

Where the system handling deployments is not integrated with a source code management system, issues may be identified in other ways. For example, when configuring a deployment a user can manually associate the deployment (or the source code on which the deployment is based) with one or more issue identifiers. Any means of association may be used, for example a dedicated deployment attribute or variable, metadata, or other association mechanism.

Updating Issue Tracking System with Deployment Information

Figure 11:
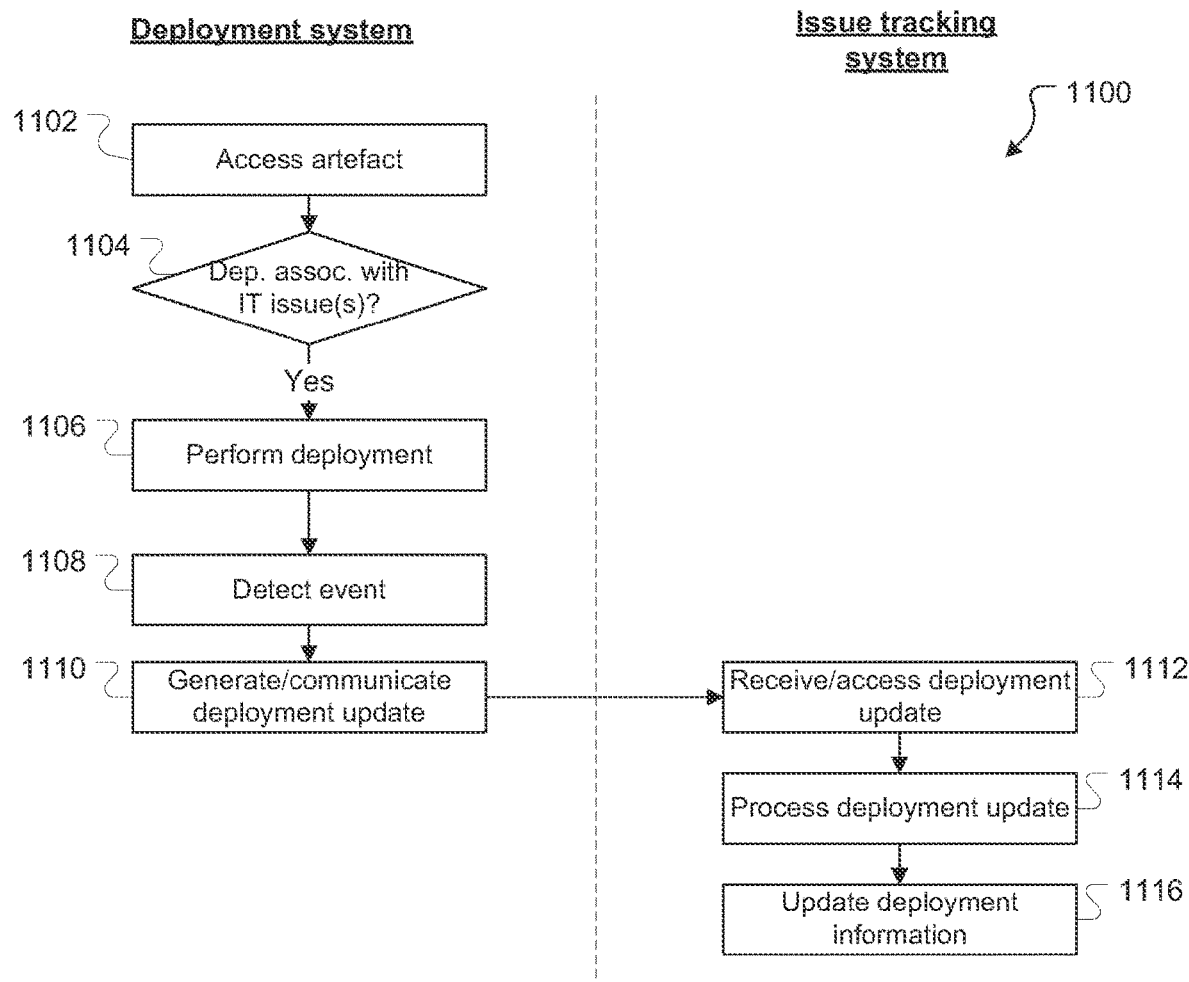
FIG. 11 is a flowchart indicating operations performed to update an issue tracking system with deployment information.

Turning to FIG. 11, a flowchart 1100 showing the operations performed to update the IT system when deployment events occur at the CID system 140 will be described.

At 1102, the CID server 142 accesses an artefact that is to be deployed. In the embodiments described herein, the artefact is identified by the source code on which the artefact is based (in the same or a similar manner as described with reference to FIG. 8 above).

At 1104, the CID server 142 determines whether the deployment is associated with any issues maintained by the IT system. As discussed above, determining whether the deployment is associated with any IT system issues may, for example, be performed by checking whether information associated with the source code on which the artefact being deployed is based is associated with any IT system issues (e.g. by inclusion of IT system issue identifiers in a commit message or the like).

If the deployment is not associated with any issues maintained by the IT system, the present process ends. In this case the deployment server 142 continues the deployment process normally however does not generate a deployment update to be communicated to the IT server 122.

If the deployment is associated with one or more issues maintained by the IT system, processing continues to 1106. At 1106, the CID server 142 performs the deployment.

At 1108, the CID server 142 detects occurrence of a notifiable deployment event. Notifiable deployment events may include, for example, that the deployment: has been initiated; has been cancelled; is in progress; has been successful; has failed, has been rolled back. The CID server 142 may be configured to nominate any event as a notifiable deployment event (insofar as the event is simply a trigger for generating and communicating a deployment update). By way of example, however, a notifiable deployment event may be that a deployment has been successful or a deployment has failed.

At 1110, the CID server 142 generates a deployment update and communicates the deployment update to the IT server 122.

The specific information generated for inclusion in a deployment update, and the manner in which it is communicated to the IT server 122, will depend on the particular IT and CID systems used. In the present embodiments, deployment updates are communicated by way of an API call. Table I below provides a specific example of a deployment information update (in cURL format) that can be used to provide deployment data to the Jira IT system:

TABLE I

Example deployment information update

```
curl --request POST \
   --url 'https://your-domain.atlassian.net/rest/deployments/0.1/bulk' \
   --user 'email@example.com:' \
   --header 'Accept: application/json' \
   --header 'Content-Type: application/json' \
   --data'{
   "properties": {
      "accountId": "account-234",
      "projectId": "project-123"
```

TABLE I-continued

Example deployment information update

```
   },
   "deployments": [
      {
         "deploymentSequenceNumber": 100,
         "updateSequenceNumber": 1,
         "issueKeys": [
            "ABC-123"
         ],
         "displayName": "Deployment number 16 of Data Depot",
         "url": "http://mydeployer.com/project11/1111-222-333/prod-east",
         "description": "The bits are being transferred",
         "lastUpdated": "2018-01-20123:27:25+00:00",
         "label": "Release 2018-01-20_08-47-bc2421a",
         "state": "in_progress",
         "pipeline": {
            "id": "e9c906a7-451f-4fa6-ae1a-c389e2e2d87c",
            "displayName": "Data Depot Deployment",
            "url": "http://mydeployer.com/project1"
         },
         "environment": {
            "id": "8ec94d72-a4fc-4ac0-b31d-c5a595f373ba",
            "displayName": "US East",
            "type": "production"
         },
         "schemaVersion": "1.0"
      }
   ]
}
```

The following paragraphs describe the API schema used in the deployment information update shown in Table I. It will be appreciated that this is by way of specific example only. Alternative schemas capturing additional, reduced, or alternative deployment information/data (in the same or alternative ways) are possible.

The 'properties' object can be used to provide arbitrary properties that submitted deployments are tagged with. These properties can be used, for example, for delete operations to clean up all deployment information associated with an account in the event that the account is removed.

The 'deployments' array provides a list of deployments and associated information that are submitted to the IT system. Each deployment may be associated with 1 or more IT system issue identifiers/keys, and will also be associated with any properties included in the request.

Each element of the 'deployments' array is an object providing data related to a single deployment.

The 'deploymentSequenceNumber' integer in the example 'deployments' array element is used to identify the deployment. The deploymentSequenceNumber must be unique for the pipeline and environment that are specified (per the pipeline and environment objects discussed below). In the present example the deploymentSequenceNumber is specified to be a monotonically increasing number to allow it to be used to sequence deployments.

The 'updateSequenceNumber' integer in the example 'deployments' array element is used to apply an ordering to updates to the deployment (as identified by the deploymentSequenceNumber) in the case of out-of-order receipt of deployment updates. This is similar to the 'updateSequenceId' in the example feature flag update described above.

The 'issueKeys' array in the example 'deployments' array element is used to provide one or more IT system issue keys to associate the deployment information with. As discussed above, issue keys may be identified/extracted from data associated with the source code on which the deployment was based (e.g. a commit message or the like).

The 'displayName' string in the example 'deployments' array element is used to provide a human-readable name for the deployment.

The 'url' string in the example 'deployments' array element is used to provide a URL to the deployment (in the specified environment) in the CID system 140.

The 'description' string in the example 'deployments' array element is used to provide a description of the deployment.

The 'lastUpdated' string in the example 'deployments' array element is used to provide a timestamp at which the state of the deployment was provided.

The 'label' string in the example 'deployments' array element can be used to provide further (human-readable) information in respect of the deployment. For example, the label can be used to display version information for the deployment.

The 'state' string in the example 'deployments' array element is used to provide the state of the deployment. This may, for example, be unknown, pending, in_progress, cancelled, failed, rolled_back, successful, and/or any other relevant deployment state.

The 'pipeline' object in the example 'deployments' array element is used to provide information in respect of the pipeline that generated the deployment.

In the 'pipeline' object, the 'id' string is used to identify the pipeline, and must be unique for the CID (or integrations) system.

In the 'pipeline' object, the 'displayName' string is used to provide the name of the pipeline.

In the 'pipeline' object, the 'url' string provides a link to the deployment pipeline.

The 'environment' object in the example 'deployments' array element is used to provide information on the environment targeted by the deployment.

In the 'environment' object, the 'id' string is used to identify the environment, and must be unique for the CID (or integrations) system so it can be shared across pipelines.

In the 'environment' object, the 'displayName' string is used to provide the name of the environment.

In the 'environment' object, the 'type' string is used to provide the type of the environment—for example unmapped, development, testing, staging, production, or any other appropriate environment type.

The 'schemaVersion' string in the example 'deployments' array element is used to define the schema version used for the deployment update.

At 1112, the IT server 122 receives/accesses the deployment update communicated by the CID server 140.

At 1114, the IT server 122 processes the deployment update to extract relevant information therefrom (or generate information based on information therein). The extracted/generated information includes issue identification information that allows the issue(s) that the update relates to be identified and deployment information in respect of the deployment event(s) that has/have occurred.

At 1116, the IT server 122 uses the information extracted from the deployment update to update one or more issues maintained by the IT system. This involves saving the extracted/generated deployment information to the IT data store 124, and associating the deployment information with the relevant issue(s).

Deleting Deployment Information from the IT System

Mechanisms are also provided to delete deployment information from the IT system.

Table J provides an example API call that can be used (e.g. by the CID system 140) to cause the IT system to delete deployment information currently stored by the IT system based on a deployment key:

TABLE J

| Example for deleting deployment data by key |
|---|
| curl --request DELETE \<br>   --url 'https://your-domain.atlassian.net/rest/deployments/0.1/pipelines/{pipelineId}/environments/{environmentId}/deployments/{deploymentSequenceNumber}' \<br>   --user 'email@example.com:<api_token>' |

The delete by key API call requires a pipelineId, environmentId, and deploymentSequenceNumber. On receiving the call the IT system identifies the specified deployment information (i.e. deployment information with the specified pipelineId, environmentId, and deploymentSequenceNumber) and deletes it.

By way of further example, Table K provides an example API call that can be used to cause the IT system to delete deployment data currently stored by the IT system based on deployment information properties (e.g. as defined by the 'properties' object in a deployment update):

TABLE K

| Example for deleting deployment data by properties |
|---|
| curl --request DELETE \<br>   --url 'https://your-domain.atlassian.net/rest/deployments/0.1/bulkByProperties' \<br>   --user 'email@example.com:<api_token>' |

In this case one or more properties are defined (e.g. DELETE /bulkByProperties?accountId=<123>&createdBy=<456>). On receiving the call the IT system identifies the specified deployment information (i.e. deployment information matching all defined properties) and deletes it.

In some implementations, an updateSequenceId may also be used to control the deletion of deployment information (either by ID or by properties). In this case, only stored data with an updateSequenceId less than or equal to that provided will be deleted. This can be used help ensure submit/delete requests are applied correctly if issued close together.

Querying Deployment Information Maintained by the IT System

Mechanisms are also provided to query deployment information maintained by the IT system. In certain embodiments this is also enabled by an API call, an example of which is provided in Table L below:

TABLE L

Example request for deployment information stored by IT system

```
curl --request GET \
  --url 'https://your-
domain.atlassian.net/rest/deployments/0.1/pipelines/{pipelineId}/deployments/
{deploymentNumber}' \
    --user 'email@example.com:<api_token>' \
    --header 'Accept: application/json'
```

In this example, the deployment information is identified by a pipelineId, environmentId, and deploymentSequenceNumber. In response to a valid Get deployment information call, the IT system identifies and returns the deployment information associated with the specified deployment (for example using the deployment update schema described in Table I above).

Issue Display and Interaction Including Deployment Information

Figure 12:
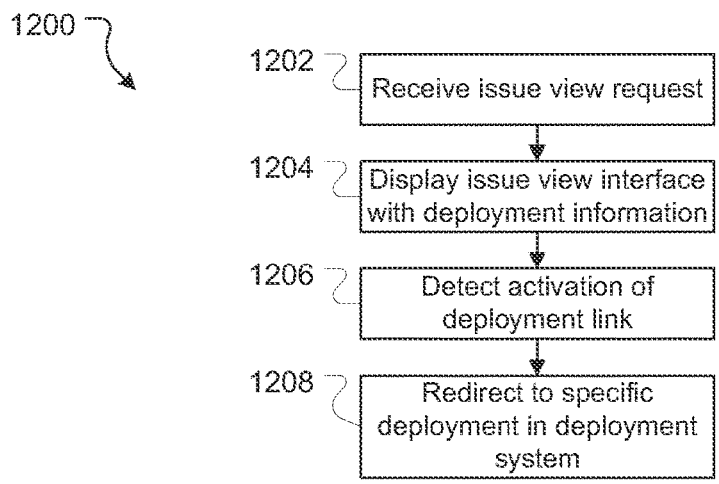
FIG. 12 is a flowchart indicating operations performed to view and interact with deployment information at an issue tracking system.

FIG. 12 is a flowchart 1200 of operations performed by an IT system in displaying an issue that has been associated with deployment information and facilitating interaction therewith.

At 1202, the IT system receives a request to view an issue associated with deployment information. Such interaction may be made through typical IT system mechanisms, e.g. an issue search/browsing interface provided via the IT client 112.

At 1204, the IT client 112 causes the user device 110 to display an issue view interface which provides certain ITS issue information along with ITS deployment information (i.e. deployment information that the IT system has received from a CID system and saved to the IT data store 124). Displaying deployment information in the IT system issue view interface allows users of the IT system to see certain deployment information without having to navigate to or otherwise access the system performing/managing the deployment.

The IT system may be configured to display various deployment information in the issue view. The specific information that can be displayed will depend on the implementation and the deployment information communicated to the IT system (for example in a deployment update as described above with respect to Table I), any of which can be displayed by the IT system without having to access the CID (or deployment) system.

The IT system may be configured to display summary deployment information by default and allow user interaction to cause further/more detailed deployment information to be displayed. For example, and as described with respect to example UI 1300 below, the IT system may display deployment summary information that indicates what environment a deployment associated with the issue has occurred in. In addition, the deployment summary information includes a detailed deployment information control which, when activated by a user provides more detailed deployment information.

In certain embodiments, the IT system is further configured to display or provide a deployment system link. The deployment system link is configured to link directly to a specific deployment associated with the issue within the CID system 140. The deployment system link may be provided in a summary deployment view, a detailed deployment view, or in both views.

At 1206, the IT client 112 detects activation of the deployment system link, for example by a user contacting, clicking on, or otherwise interacting with the link.

At 1208, in response to detecting activation of the deployment system link, the IT system effects a redirect to the CID system 140, and in particular to an interface in respect of the specific deployment indicated by the deployment link/associated with the issue. As described above, this redirection may be performed in various ways. As part of the redirection the IT system provides credentials to the CID system 140 allowing for automatic authentication of the user by the CID system 140 (i.e. without requiring any further user interaction).

Figure 13A:
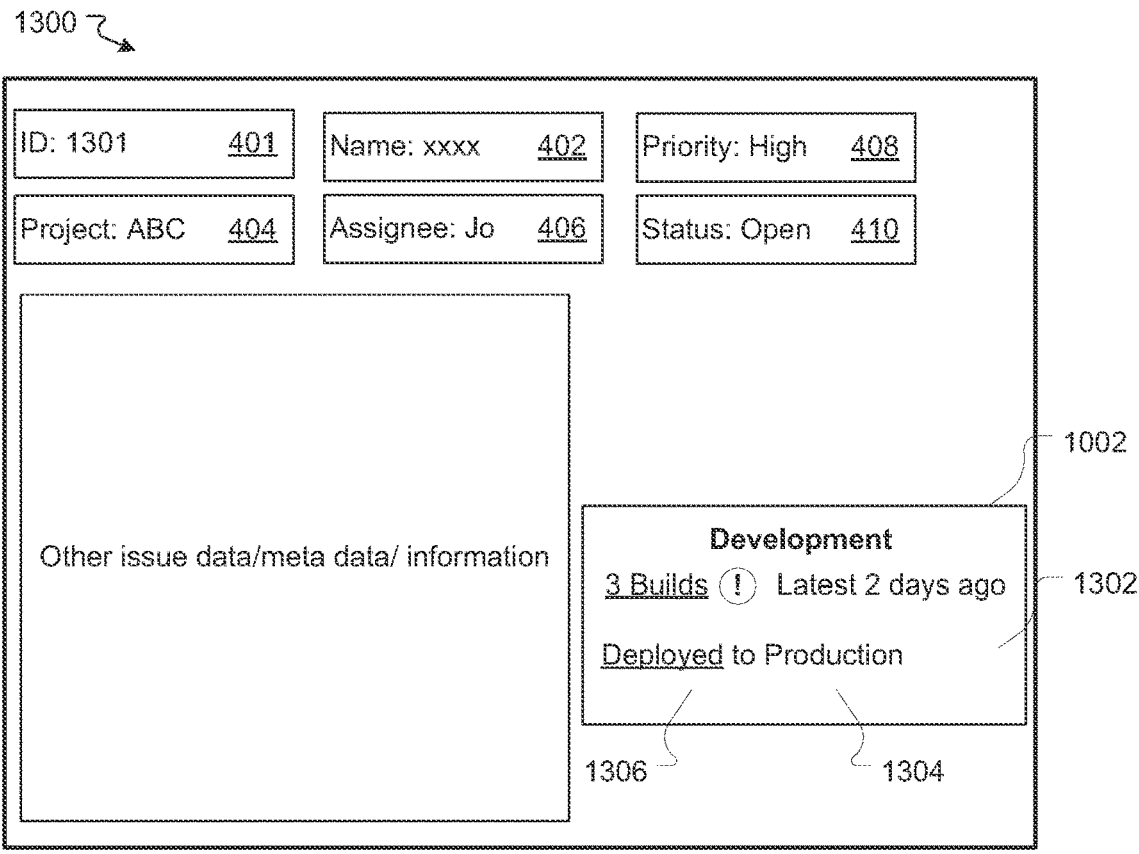
FIG. 13A and FIG. 13B provide an example issue tracking system user interface for viewing/interacting with an issue that has been associated with deployment information.
Figure 13B:
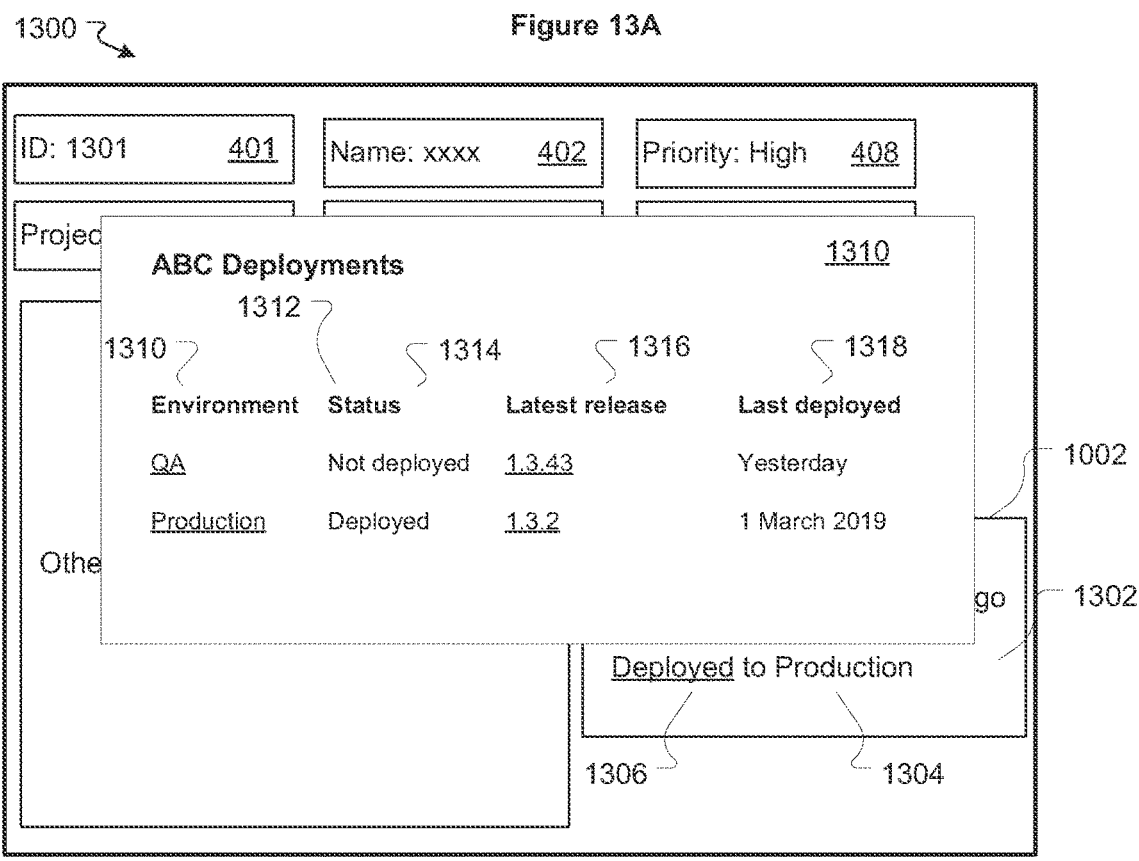

FIGS. 13A and 13B provide an example of an IT system issue view user interface 1300. Interface 1300 is in respect of an issue associated with deployment information. As with issue view interface 400, interface 1300 displays a number of general issue details (the same reference numerals have been used and these elements will not be described again).

User interface 1300 further includes a development section/pane 1002 as described above with reference to FIG. 10. In this case, as well as displaying build information the development pane 1002 also includes a deployment summary 1302 which in this case includes text indicating the environment 1304 deployed to (specifically, here, the "production" environment). The deployment summary includes a detailed deployment information control 1306, which in this case is provided by the text "Deployed" being a hyperlink.

When the detailed deployment information control 1306 is activated by a user (e.g. by clicking, hovering, contacting or any other means) detailed deployment information is displayed. FIG. 13B provides an example of this, in which detailed deployment information is displayed in a deployment detail dialogue 1310 that is displayed atop the issue view. In this example, the deployment detail dialogue 1310 displays each deployment environment 1312 (provided by the environment displayName field of the deployment update), the deployment status 1314 (provided by the state field of the deployment update), the latest release 1316 (provided by the label field of the deployment update), and the last deployed time 1318 (provided by the lastUpdated field in the deployment update).

In the example deployment detail dialogue 1310, the environment values and release values are both deployment system links link (e.g. hyperlinks) which can be activated by a user to cause the user to be redirected to the particular deployment environment (where the environment value is activated) or release (where the release value is activated) in the CID system.

Any other deployment information received in a deployment update and stored by the IT system can be displayed in the IT system UI.

Deployment System Integration Example Embodiments

According to an embodiment of the present disclosure, a computer implemented method comprises: receiving, by an issue tracking system, a deployment update from a deployment system, the deployment update including deployment information in respect of one or more issues maintained by the issue tracking system; associating, by the issue tracking system, one or more issues maintained by the issue tracking system with deployment information by: processing, by the issue tracking system, the deployment update to identify the one or more issues to which the deployment information in the deployment update relates; extracting, by the issue tracking system, the deployment information from the deployment update; and associating, by the issue tracking system the deployment information with each of the identified issues.

The deployment update may include a plurality of deployment objects, each deployment object including distinct deployment information, and associating, by the issue tracking system, one or more issues maintained by the issue tracking system with deployment information may comprise: processing, by the issue tracking system, the deployment update to identify the one or more deployment objects included therein; and for each deployment object identified: identifying one or more issues to which the deployment information included in the deployment object relates; extracting the deployment information from the deployment object; and associating the deployment information with each of the issues identified.

The deployment information in respect of one or more issues may include: deployment identifying information identifying a particular deployment that was performed by the deployment system; and state information in respect of the particular deployment.

The deployment information in respect of one or more issues may include environment information defining an environment targeted by the deployment.

The particular deployment may be a deployment performed by the deployment system based on an artefact, the artefact in turn being based on source code related to the one or more issues that the deployment information in the deployment update is in respect of.

The deployment update may include an identifier of the source code on which the artefact on which the deployment performed by the deployment system was based.

Following the association of deployment information with one or more issues, the method may further comprise: receiving, by the issue tracking system, a request to display a particular issue that has been associated with deployment information; generating, by the issue tracking system, an issue view user interface, the issue view user interface comprising issue information and deployment display information, the deployment display information derived from the deployment information associated with the issue; causing, by the issue tracking system, the issue view user interface to be displayed on a user device.

The deployment display information may include a deployment system link and the method may further comprise: detecting activation of the deployment system link; and in response to detecting activation of the deployment system link effecting, by the issue tracking system, a redirect to the deployment system.

According to another embodiment of the present disclosure, a computer implemented method comprises: accessing, by a deployment system, an artefact; performing, by the deployment system, a deployment based on the artefact; generating, by the deployment system, a deployment update, the deployment update identifying an issue maintained by an issue tracking system and including deployment information in respect of the performed deployment; communicating, by the deployment system, the deployment update to the issue tracking system.

The artefact may be generated based on source code maintained by a source code management system, the source code being identified by a source code identifier, and wherein prior to generating the deployment update the method may further comprise: determining, by the deployment system, whether the source code identifier is associated with an issue maintained by the issue tracking system; and in response to determining that the source code identifier is associated with an issue maintained by the issue tracking system, generating the deployment update.

The source code identifier may be a commit identifier.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Query/Search Functionality

In addition to the features described above, associating issues maintained by an IT system with feature flag, build, and or deployment information enables improved searching functionality.

Where issues are associated with feature flag information users (human or programmatic) can formulate and run searches across the issues maintained by the IT system based on any feature flag information provided in feature flag updates. For example, a user could formulate a search designed to identify issues: related/linked to a particular feature flag (identified by a flag id, flag key, and/or flag display name as provided in the feature flag update); related to a feature flag with a particular status—for example issues associated with a feature flag that is enabled, issues associated with a feature flag that is enabled and 100% rolled out (or 50% rolled out or x % rolled out for any value of x), all issues associated with a feature flag that is disabled; related to any feature flag in a particular environment; or a combination of two or more feature flag fields either alone or in further combination with other issue fields maintained by the issue tracking system.

Similarly, where issues are associated with build information users (human or programmatic) can formulate and run searches across the issues maintained by the IT system based on any build information provided in build updates. For example, a user could formulate a search designed to identify issues: related to a particular build; related to particular build status—for example issues associated with a build that has failed or issues associated with a build that has succeeded; or a combination of two or more build fields either alone or in further combination with other issue fields maintained by the issue tracking system.

Similarly, where issues are associated with deployment information users (human or programmatic) can formulate and run searches across the issues maintained by the IT system based on any deployment information provided in deployment updates. For example, a user could formulate a search designed to identify issues: related to a particular deployment state (e.g. issues relating to in_progress deployments, issues relating to failed deployments, issues relating to successful (current) deployments); a particular deployment environment (and/or status), e.g. issues relating to failed deployments in the test environment; or a combination of two or more deployment fields either alone or in further combination with other issue fields maintained by the issue tracking system.

Where the IT system is integrated with/receives updates from multiple systems (e.g. a feature flag system, a build system, and a deployment system), queries may be formulated based on a combination of any/all of the available information fields—e.g. a combination of one or more feature flag fields (as provided by feature flag updates), one or more build fields (as provided by build updates), one or more deployment fields (as provided by deployment updates), and/or one or more IT system fields (as natively maintained by the IT system).

As used herein the terms "include" and "comprise" (and variations of those terms, such as "including", "includes", "comprising", "comprises", "comprised" and the like) are intended to be inclusive and are not intended to exclude further features, components, integers or steps.

Various features of the disclosure have been described using flowcharts. The functionality/processing of a given flowchart step could potentially be performed in various different ways and by various different systems or system modules. Furthermore, a given flowchart step could be divided into multiple steps and/or multiple flowchart steps could be combined into a single step. Furthermore, the order of the steps can be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. A computer-implemented method comprising:
    cause display of an issue view interface of an issue tracking system on a client device;
    in response to an issue view user request with respect to a particular issue, the issue view user request received at the client device, cause display of issue data for the particular issue within the issue view interface on the client device;
    in response to a first user input at the issue view interface, generating an association request with respect to the particular issue;
    in response to the first user input provided to the issue view interface:
        cause display of a system association interface configured to receive user input designating one or more external objects to be associated with the particular issue, the one or more external objects managed by an external system distinct from the issue tracking system;
        in response to a second user input provided to the system association interface, generate an association between the particular issue and the one or more external objects;
    obtain object data, from the external system, associated with the one or more external objects;
    subsequent to obtaining the object data from the external system, creating the association between the particular issue and the one or more external objects;
    cause display of an external object region within the issue view interface, the external object region including an object summary comprising at least a portion of the object data; and
    in response to a third user input provided to the issue view interface, causing display of a detail pane comprising additional object data obtained from the external system, the additional object data comprising elements relating to one or more events generated by the external system with respect to the one or more external objects.

2. The computer-implemented method of claim 1, wherein:
    the external system is a feature flag system configured to manage feature flags for a software application; and
    the one or more external objects is a particular feature flag managed by the feature flag system.

3. The computer-implemented method of claim 2, wherein:
    subsequent to creating the association between the particular issue and the one or more external objects, the issue view interface includes a feature-flag system link; and
    user selection of the feature-flag system link causes the client device to display a feature-flag interface of the feature flag system.

4. The computer-implemented method of claim 2, wherein the system association interface includes a first option to associate an issue with an existing feature flag and a second option to create a new feature flag.

5. The computer-implemented method of claim 2, wherein:
    the object summary includes a feature-flag status graphical element; and
    in response to a particular feature flag being turned in within the feature flag system, the feature-flag status graphical element includes an indicia of an activation of the particular feature flag.

6. The computer-implemented method of claim 2, wherein:
    the issue view interface further comprises a feature-flag rollout status indicator; and
    the feature-flag rollout status indicator includes an indicia of a deployment status of the particular feature flag.

7. The computer-implemented method of claim 1, wherein:
    the external system is a source code deployment system configured to manage deployment of a software application; and
    the one or more external objects is a particular deployment managed by the source code deployment system.

8. The computer-implemented method of claim 7, wherein:
    subsequent to creating the association between the particular issue and the one or more external objects, the issue view interface includes a deployment system link; and user selection of the deployment system link causes the client device to display a deployment environment interface of the source code deployment system.

9. The computer-implemented method of claim 7, wherein the system association interface includes a first option to associate an issue with an existing deployment.

10. The computer-implemented method of claim 7, wherein:
the object summary includes a deployment status graphical element; and
the deployment status graphical element indicates a deployment state of the software application.

11. The computer-implemented method of claim 7, wherein:
the issue view interface further comprises a deployment detail dialogue; and
the deployment detail dialogue includes a list of events performed with respect to the software application by the source code deployment system.

12. An issue tracking system comprising:
a processor,
a communication interface, and
a non-transitory computer-readable storage medium storing sequences of instructions, which when executed by the processor, cause the processor to:
cause display of an issue view interface of an issue tracking system on a client device;
in response to an issue view user request with respect to a particular issue, the issue view user request received at the client device, cause display of issue data for the particular issue within the issue view interface on the client device;
in response to a first user input at the issue view interface, generating an association request with respect to the particular issue;
in response to the association request with respect to the particular issue:
cause display of a system association interface configured to receive user input designating an external element to be associated with the particular issue, the external element managed by an external system distinct from the issue tracking system;
in response to a second user input provided to the system association interface, create an association between the particular issue and the external element;
obtain object data from the external system, associated with the one or more external objects;
subsequent to obtaining the object data from the external system, creating the association between the particular issue and the external element;
cause display an external object region within the issue view interface, the external object region including an object summary comprising at least a portion of the object data; and
in response to a third user input provided to the issue view interface, causing display of a detail pane comprising additional object data obtained from the external system, the additional object data comprising elements relating to one or more events generated by the external system with respect to the one or more external objects.

13. The issue tracking system of claim 12, wherein:
the external system is a source code deployment system configured to manage deployment of a software application; and the external element is a particular deployment managed by the source code deployment system.

14. The issue tracking system of claim 13, wherein:
subsequent to creating the association between the particular issue and the external element, the issue view interface includes a deployment system link; and
user selection of the deployment system link causes the client device to display a deployment environment interface of the source code deployment system.

15. The issue tracking system of claim 13, wherein:
the object summary includes a deployment status graphical element; and
the deployment status graphical element indicates a deployment state of the software application.

16. The issue tracking system of claim 13, wherein:
the issue view interface further comprises a deployment detail dialogue; and
the deployment detail dialogue includes a list of events performed with respect to the software application by the source code deployment system.

17. The issue tracking system of claim 12, wherein:
the external system is a feature flag system configured to manage feature flags for a software application; and
an external object of the one or more external objects is a particular feature flag managed by the feature flag system.

18. The issue tracking system of claim 17, wherein:
subsequent to creating the association between the particular issue and external element, the issue view interface includes a feature-flag system link; and
user selection of the feature-flag system link causes the client device to display a feature-flag interface of the feature flag system.

19. A computer-implemented method comprising:
cause display of an issue view interface of an issue tracking system on a client device;
in response to an issue view user request with respect to a particular issue, the issue view user request received at the client device, cause display of issue data for the particular issue within the issue view interface on the client device;
detecting an association between the particular issue and an external element managed by an external system distinct from the issue tracking system;
in response to detecting an association between the particular issue and an external element managed by an external system distinct from the issue tracking system:
obtain object data, from the external system, associated with the external element;
cause display of a graphical element within an external object region within the issue view interface, the graphical element including an object summary comprising at least a portion of the object data based on object data obtained from the external system; and
in response to a user input provided to the issue view interface, causing display of a detail pane comprising additional object data obtained from the external system, the additional object data comprising elements relating to the external element.

20. The computer-implemented method of claim 19, wherein:
the external system is a feature flag system configured to manage feature flags for a software application;
the external element is a particular feature flag managed by the feature flag system;

the object summary includes a feature-flag status graphical element; and in response to the particular feature flag being turned in within the feature flag system, the feature-flag status graphical element includes an indicia of an activation of the particular feature flag.

21. The computer-implemented method of claim 19, wherein:

the external system is a source code deployment system configured to manage deployment of a software application;

the external element is a particular deployment managed by the source code deployment system;

the object summary includes a deployment status graphical element; and the deployment status graphical element indicates a deployment state of the software application.

\* \* \* \* \*